(12) United States Patent
Hiraguchi

(10) Patent No.: US 7,334,752 B2
(45) Date of Patent: *Feb. 26, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 11/063,526

(22) Filed: Feb. 24, 2005

(65) Prior Publication Data

US 2005/0184179 A1    Aug. 25, 2005

(30) Foreign Application Priority Data

Feb. 24, 2004    (JP)    ............................. 2004-048566

(51) Int. Cl.
*G11B 23/107* (2006.01)

(52) U.S. Cl. ...................................... 242/348; 360/132

(58) Field of Classification Search ............ 242/338.1, 242/338.3, 343, 348, 348.2; 360/132
See application file for complete search history.

(56) References Cited

U.S. PATENT DOCUMENTS

| | | | |
|---|---|---|---|
| 3,920,196 A | 11/1975 | Tucker et al. | |
| 4,014,042 A | 3/1977 | Schoettle et al. | |
| 4,033,523 A | 7/1977 | Roman | |
| 4,210,296 A | 7/1980 | Frechette | |
| 4,742,415 A | 5/1988 | Oishi | |
| 5,435,498 A * | 7/1995 | Makino | .................. 242/343.2 |
| 5,436,782 A | 7/1995 | Sieben | |
| 5,547,142 A | 8/1996 | Cheatham et al. | |
| 5,813,622 A | 9/1998 | von Alten | |
| 5,901,916 A | 5/1999 | McAllister et al. | |
| 6,038,112 A | 3/2000 | Kletzl | |
| 6,234,416 B1 | 5/2001 | Nayak | |
| 6,318,657 B1 | 11/2001 | Nayak | |
| 6,452,747 B1 | 9/2002 | Johnson et al. | |
| 6,572,045 B2 | 6/2003 | Blair et al. | |
| 6,581,866 B2 | 6/2003 | Tsuyuki et al. | |
| 7,040,564 B1 | 5/2006 | Veno et al. | |

(Continued)

FOREIGN PATENT DOCUMENTS

EP    0 347 947 A2    12/1989

(Continued)

*Primary Examiner*—John Q. Nguyen
(74) *Attorney, Agent, or Firm*—Sughrue Mion, PLLC

(57) ABSTRACT

A recording tape cartridge (10) includes: a case (12) that houses a reel (40) onto which a recording tape is wound, the case comprising an upper case (14) including a top plate (14A) and a lower case (16) including a bottom plate (16A); lock members (90) that are disposed, so as to be slidable in a radial direction of the reel, in an attachment portion (60) formed on an inner surface of the top plate, the lock members being movable between a rise/fall lock position, at which the lock members are intervened between an upper surface of the reel and the top plate to prevent movement in an axial direction of the reel, and a rise/fall allowance position, at which the lock members are retracted from between the upper surface of the reel and the top plate to allow movement in the axial direction of the reel; and projecting portions (70A) that are formed on the inner surface of the top plate and project towards the lock members so that the lock members do not fall out of the attachment portion at least when the case is assembled.

13 Claims, 20 Drawing Sheets

U.S. PATENT DOCUMENTS

| | | |
|---|---|---|
| 7,104,486 B2 | 9/2006 | Hiraguchi |
| 7,159,815 B2 * | 1/2007 | Alexander et al. .......... 242/348 |
| 2001/0026030 A1 | 10/2001 | Morita et al. |
| 2002/0141087 A1 | 10/2002 | Hiraguchi et al. |
| 2003/0142441 A1 | 7/2003 | Morita et al. |
| 2004/0026550 A1 | 2/2004 | Hiraguchi et al. |
| 2005/0023400 A1 | 2/2005 | Hiraguchi |
| 2005/0184180 A1 | 8/2005 | Hiraguchi |
| 2005/0184181 A1 | 8/2005 | Hiraguchi |
| 2005/0184182 A1 | 8/2005 | Hiraguchi |
| 2005/0211813 A1 | 9/2005 | Hiraguchi |

FOREIGN PATENT DOCUMENTS

| | | |
|---|---|---|
| EP | 0 488 387 A1 | 6/1992 |
| EP | 1 098 321 A1 | 5/2001 |
| EP | 1 569 229 A2 | 8/2005 |
| EP | 1 569 232 A2 | 8/2005 |
| JP | 5-258524 A | 10/1993 |
| JP | 7-161166 A | 6/1995 |
| JP | 11-39833 A | 2/1999 |
| WO | WO 98/44506 A2 | 10/1998 |

* cited by examiner

RECORDING TAPE CARTRIDGE

CROSS-REFERENCE TO RELATED APPLICATION

This application claims priority under 35 USC 119 from Japanese Patent Application No. 2004-048566, the disclosure of which is incorporated by reference herein.

BACKGROUND OF THE INVENTION

1. Field of the Invention

The present invention relates to a recording tape cartridge including a case that houses a single reel onto which is wound a recording tape such as magnetic tape mainly used as a recording and playback medium for computers and the like.

2. Description of the Related Art

Conventionally, a recording tape cartridge has been known which includes a case that is made of synthetic resin and rotatably houses a single reel onto which is wound a recording tape such as magnetic tape used as a recording and playback medium for computers and the like. When the recording tape cartridge is in use (i.e., when it has been loaded into a drive device), the reel of the recording tape cartridge is rotatable within the case, and when the recording tape cartridge is not in use (i.e., when it has not been loaded into a drive device), the reel is locked to as to not be rotatable.

Namely, the recording tape cartridge is disposed with brake means for ensuring that the reel does not rotate inside the case when the recording tape cartridge is not in use. A configuration where, for example, a brake member that is not rotatable with respect to the case is made to engage with the reel is conceivable as the brake means.

For example, as shown in FIG. 20, a disc-shaped brake member 130 is housed inside a reel hub 112 of a reel 110 so as to be movable up and down. The reel hub 112 is formed as a bottomed cylinder. A pair of engagement protrusions 134 having a substantial "U" shape when seen in plan view are disposed on an upper surface of the brake member 130 so as to protrude from the upper surface of the brake member 130. A pair of rotation regulating ribs 126, which are disposed so as to extend downward from an inner surface of an upper case 122, are inserted in the engagement protrusions 134, so that the brake member 130 is not rotatable with respect to a case 120.

The brake member 130 is continually urged towards a bottom wall 114 of the reel hub 112 by an urging member such as a compression coil spring 116 so that an annular brake gear 132 formed on an undersurface of the brake member 130 is caused to mesh with an annular engagement gear 118 formed on an upper surface of the bottom wall 114 of the reel hub 112. Thus, inadvertent rotation of the reel 110 is prevented.

A substantially cylindrical operational protrusion 136 is disposed at an axial center portion of the undersurface of the brake member 130 so as to protrude from the undersurface of the brake member 130. The operational protrusion 136 is inserted in a through hole 114A disposed in an axial center portion of the bottom wall 114 of the reel hub 112, so that the operational protrusion 136 is exposed through a gear opening 128 disposed in a substantial center portion of a lower case 124. Thus, when the reel 110 is to be made rotatable, the operational protrusion 136 (i.e., the brake member 130) is pushed upward so that the brake gear 132 disengages from the engagement gear 118 (e.g., see U.S. Pat. No. 6,452,747).

However, in this configuration, when the recording tape cartridge is not in use, the reel 110 can rise upward (i.e., is movable in the axial direction of the reel 110) counter to the urging force of the urging member such as the compression coil spring 116. Thus, when the bottom wall 114 of the reel hub 112 is accidentally moves upward by an impact applied to the recording tape cartridge due to dropping thereof or the like, there are instances where, as shown in FIG. 20, the brake member 130 ends up being caught (falls) on the peripheral edge portion of the through hole 114A in a state where the brake member 130 is slanted.

There has been the problem that if the recording tape cartridge is loaded into the drive device in this state, recording and playback are impossible, and the potential arises for the recording tape cartridge to sustain damage and for the drive device to break down. There has also been the problem that the recording tape may be adversely affected, such as the recording tape becoming wrinkled or breaking, because the reel is rotatable when the recording tape cartridge is not in use.

Also, because the distance between the upper flange and the lower flange of the reel is substantially the same as the width of the recording tape, when the reel wobbles inside the case and the outer peripheral edges of the upper flange and lower flange strike the inner surface of the case and are deformed as a result of accidentally dropping the recording tape cartridge, there has been the problem that the recording tape is adversely affected, resulting in, for example, kinks in the recording tape.

A lock mechanism may conceivably be disposed on the inner surface of the top plate of the case to prevent the reel from rising (i.e., so that the reel becomes immovable in the axial direction) when the recording tape cartridge is not in use.

However, the case is assembled by bringing the peripheral walls of the upper case and the lower case into contact so that the upper case and the lower case are joined together, and ordinarily the inner surface of the top plate of the upper case is turned over to cover the lower case. Thus, when a lock mechanism is disposed on the inner surface of the top plate, there is the potential for the parts configuring the lock mechanism to fall out at the time the case is assembled. In other words, it is necessary to improve the incorporability of the lock mechanism in the case, and devices for this purpose have conventionally been a problem.

SUMMARY OF THE INVENTION

It is an object of the present invention to obtain a recording tape cartridge which, even when incorporating a lock mechanism that can render the reel immovable in the axial direction thereof when the recording tape cartridge is not in use, can ensure that the assembly of the case is not compromised.

In order to achieve this object, a recording tape cartridge according to a first aspect of the invention includes: a case that houses a reel onto which a recording tape is wound, the case comprising an upper case including a top plate and a lower case including a bottom plate; lock members that are disposed, so as to be slidable in a radial direction of the reel, in an attachment portion formed on an inner surface of the top plate, the lock members being movable between a rise/fall lock position, at which the lock members are intervened between an upper surface of the reel and the top plate to prevent movement in an axial direction of the reel, and a rise/fall allowance position, at which the lock members are retracted from between the upper surface of the reel and the top plate to allow movement in the axial direction of the reel; and projecting portions that are formed on the inner surface of the top plate and project towards the lock members so that the lock members do not fall out of the attachment portion at least when the case is assembled.

In the present aspect, the projecting portions are formed on the inner surface of the top plate and project towards the lock members so that the lock members do not fall out of the attachment portion. Thus, (at least) when the case is assembled, i.e., when the upper case covers the lower case, the lock members are appropriately retained. In other words, according to the present aspect, the assembly of the case can be done easily and excellently even in a configuration where the lock members are disposed on the inner surface of the top plate, because such a configuration does not disturb the assembly of the recording tape cartridge (i.e., the case).

In a second aspect of the invention, the recording tape cartridge further includes a fallout prevention member that is disposed so as to straddle the lock members and which retains the lock members so that the lock members do not fall out of the attachment portion at the time the lock members slide.

In the present aspect, the fallout prevention member is disposed so as to straddle the lock members and retain the lock members so that the lock members do not fall out of the attachment portion at the time the lock members slide. Thus, the lock members are appropriately retained.

Also, due to the fallout prevention member, the lock members are appropriately retained (i.e., they are prevented from falling out of the attachment portion) even when the case is assembled (i.e., when the upper case covers the lower case).

A recording tape cartridge according to a third aspect of the invention includes: a case that houses a reel onto which a recording tape is wound, the case comprising an upper case including a top plate and a lower case including a bottom plate; lock members that are disposed, so as to be slidable in a radial direction of the reel, in an attachment portion formed on an inner surface of the top plate, the lock members being movable between a rise/fall lock position, at which the lock members are intervened between an upper surface of the reel and the top plate to prevent movement in an axial direction of the reel, and a rise/fall allowance position, at which the lock members are retracted from between the upper surface of the reel and the top plate to allow movement in the axial direction of the reel; and a fallout prevention member that is disposed so as to straddle the lock members and which retains the lock members so that the lock members do not fall out of the attachment portion at the time the lock members slide.

In the present aspect, the fallout prevention member is disposed so as to straddle the lock members and retain the lock members so that the lock members do not fall out of the attachment portion at the time the lock members slide. Thus, the lock members are appropriately retained.

Also, due to the fallout prevention member, the lock members are appropriately retained (i.e., they are prevented from falling out of the attachment portion) even when the case is assembled (i.e., when the upper case covers the lower case).

In a fourth aspect of the invention, a predetermined clearance is secured between the lock members and the fallout prevention member according to the second or third aspect.

In the present aspect, the predetermined clearance is secured between the lock members and the fallout prevention member. Thus, there are no drawbacks such as the sliding of the lock members being obstructed by the fallout prevention member.

In a fifth aspect of the invention, the recording tape cartridge further includes position regulating means that are disposed at the outer side of the attachment portion and regulate the positions of the lock members urged outward in the radial direction of the reel by the urging means disposed in the attachment portion.

In the present aspect, the position regulating means are disposed at the outer side of the attachment portion and regulate the positions of the lock members urged outward in the radial direction of the reel by the urging means disposed in the attachment portion. Thus, when the lock members are incorporated in the attachment portion, they are incorporated in a state where a certain amount of tension is applied. Thus, when the case is assembled (i.e., when the upper case covers the lower case), it becomes more difficult for the lock members to fall out of the attachment portion.

According to the present invention, it is possible to provide a recording tape cartridge which, even when incorporating a lock mechanism that can render the reel immovable in the axial direction thereof when the recording tape cartridge is not in use, can ensure that the lock mechanism does not disturb the assembly of the case.

DETAILED DESCRIPTION OF THE INVENTION

Figure 1:
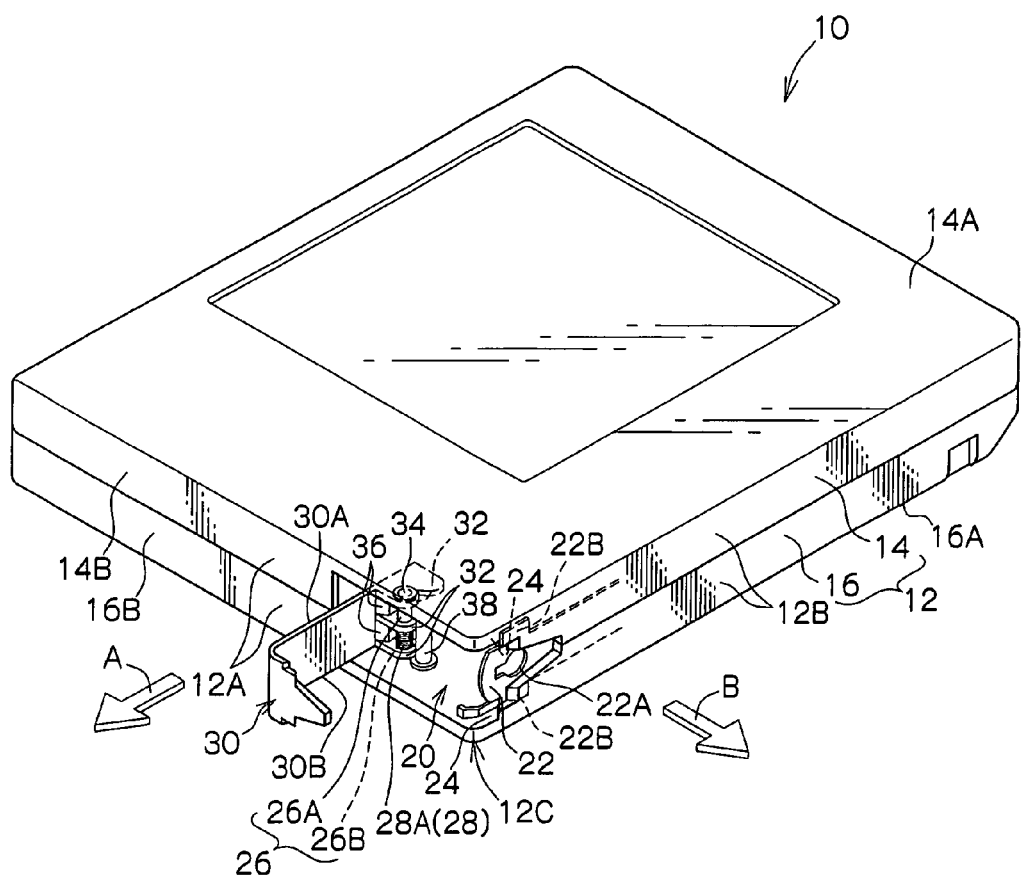
FIG. 1 is a schematic perspective view of a recording tape cartridge.

An embodiment of the invention will be described in detail below on the basis of examples showing in the drawings. For convenience of explanation, the direction in which the recording tape cartridge is loaded into a drive device will be represented by arrow A and referred to as the front direction of the recording tape cartridge. Arrow B will represent a left direction, and expressions such as front/rear, left/right and up/down will be given on the basis of these directions. When "radial direction" is used in the following description, this will indicate a direction parallel to directions facing radially outward from an axial center (core) of a reel housed in a case.

As shown in FIG. 1, a recording tape cartridge 10 includes a case 12, which has a substantially rectangular box-like shape. The case 12 includes an upper case 14 and a lower case 16 that are made of a resin such as PC. The upper case 14 includes a peripheral wall 14B vertically disposed at the peripheral edge of a top plate 14A, and the lower case 16 includes a peripheral wall 16B vertically disposed at the peripheral edge of a bottom plate 16A. The case 12 is configured by joining together, using ultrasonic welding or screws, the upper case 14 and the lower case 16 in a state where the peripheral wall 14B and the peripheral wall 16B are brought into contact with each other.

Figure 2:
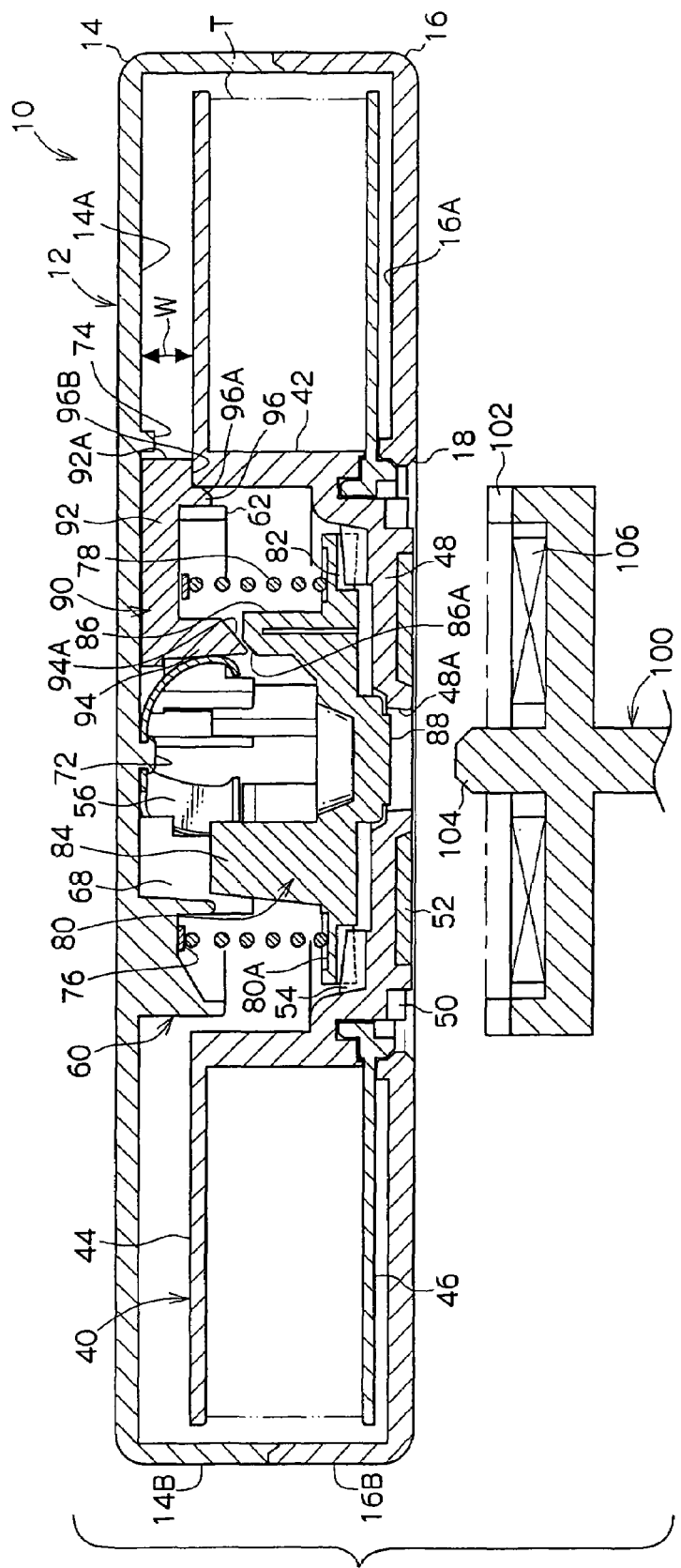
FIG. 2 is a schematic side sectional view of the recording tape cartridge prior to the rising of a rotating shaft.
Figure 3:
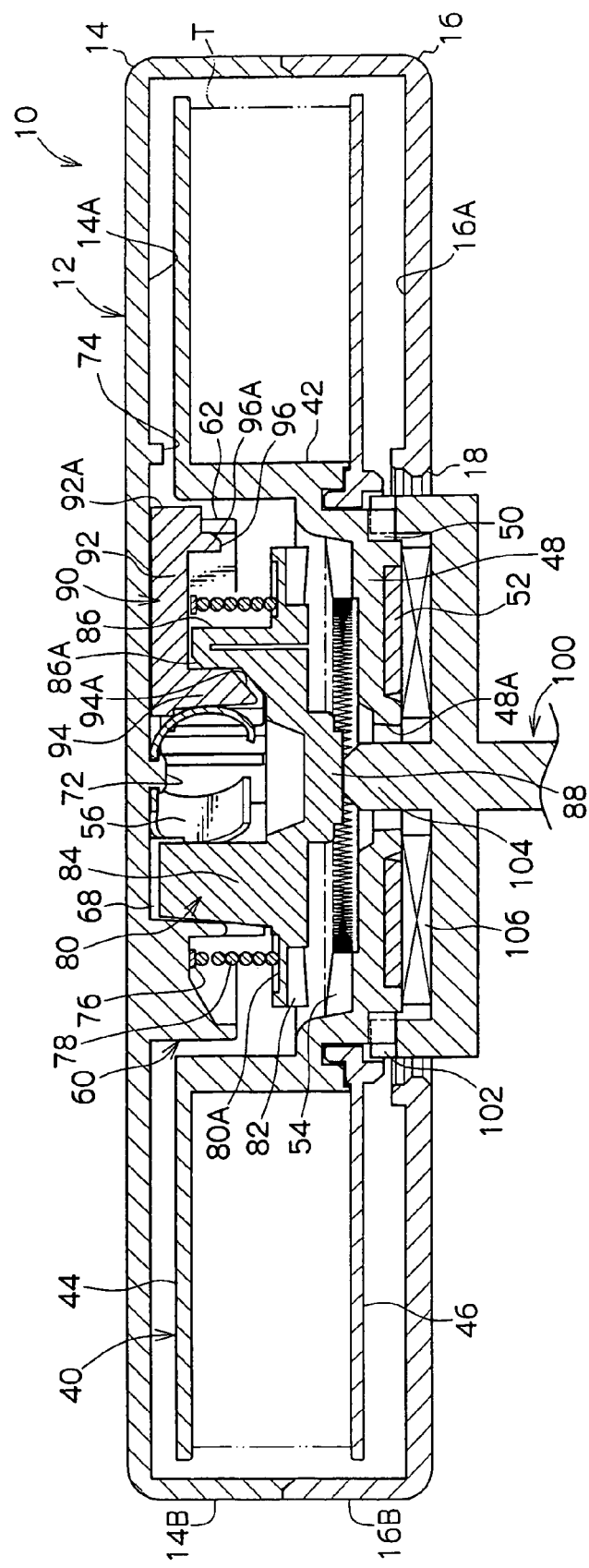
FIG. 3 is a schematic side sectional view of the recording tape cartridge after the rising of the rotating shaft.

A single reel 40 is rotatably housed inside the case 12. As shown in FIGS. 2 and 3, the reel 40 includes a reel hub 42, an upper flange 44 and a lower flange 46. The reel hub 42 is formed as a bottomed cylinder and configures an axial center portion. The upper flange 44 is disposed on an upper end portion of the reel hub 42 and is integrally molded with the reel hub 42. The lower flange 46 is ultrasonically welded to a lower end portion of the reel hub 42.

A recording tape T such as magnetic tape serving as an information recording and playback medium is wound onto an outer peripheral surface of the reel hub 42. Width-direction end portions of the wound recording tape T are retained by the upper flange 44 and the lower flange 46.

As shown in FIG. 1, an opening 20 for pulling the recording tape T wound onto the reel 40 to the outside is formed in the vicinity of a corner portion 12C at the left front side of the recording tape cartridge 10. Namely, the opening 20 is formed across a front wall 12A and a left side wall 12B adjacent to the corner portion 12C. A leader tape 22 that is fixed to an end portion of the recording tape T and disposed along the left side wall 12B is pulled out through the opening 22.

It will be noted that the corner portion referred to here is the ridge portion intersecting the peripheral walls 14B and 16B of the substantially box-shaped case 12 at a substantial right angle or obtuse angle when seen in plan view. Thus, the corner portion 12C is the ridge portion where the front wall 12A and the left side wall 12B intersect at a substantial right angle when seen in plan view.

The leader tape 22 is a pulled-out member with which a pullout member (not shown) of a drive device engages in order for the pullout member to pull out the recording tape T. A hole portion 22A with which the pullout member engages is disposed in the vicinity of a distal end of the leader tape 22. Projecting portions 22B, which project upward and downward, are formed at both upper and lower sides of the leader tape 22 slightly rearward of the distal end of the hole portion 22A.

The projecting portions 22B are housed (inserted) in recessed housing portions 24 formed in the inner surface of the upper case 14 and the inner surface of the lower case 16, whereby the leader tape 22 is retained inside the case 12.

When the recording tape cartridge 10 is not in use, the opening 20 is closed off by a door 30. The door 30 is formed in a substantial "L" shape when seen in plan view, and has substantially the same shape and size as the shape and size of the opening 20. The door 30 is preferably molded using an olefin resin such as POM, but it may also be molded using a resin such as PC or a metal such as SUS.

A support shaft 26 serving as the rotational fulcrum of the door 30 is disposed at the front wall 12A side of the upper case 14 and the lower case 16. The upper case 14 side of the support shaft 26 comprises a cylindrical boss 26A, and the lower case 16 side of the support shaft 26 comprises a columnar boss 26B. The support shaft 26 is configured as a result of the distal end (upper end) of the boss 26B at the lower case 16 side being fitted into the boss 26A at the upper case 14 side. Thus, the diameter of the boss 26B is slightly smaller than the diameter of the boss 26A.

Three planar rotating sliding portions 32 are disposed parallel to each other in the vicinity of the right end portion (i.e., at a position offset a predetermined distance left of the right end portion) of the inner surface of the door 30. The rotating sliding portions 32 project from both top and bottom end portions of the inner surface of the door 30 and from an intermediate portion slightly offset downward from the middle. Through holes into which the support shaft 26 is fitted are disposed in the rotating sliding portions 32. Thus, the door 30 is rotatably supported as a result of the support shaft 26 being inserted into the through holes.

Annular convex portions 34 are formed around the through holes at the upper surface of the uppermost rotating sliding portion 32 and at the lower surface of the lowermost rotating sliding portion 32. The annular convex portions 34 contact the upper case 14 and the lower case 16, so that a gap of about 0.3 mm to about 0.5 mm is formed between an upper end surface 30A of the door 30 and the upper case 14 and between a lower end surface 30B of the door 30 and the lower case 16.

A protruding portion 36, which has an arced shape along the peripheral surface of the support shaft 26 when seen in planar cross section, is formed at the inner surface of the door 30 between the rotating sliding portions 32. A wound portion 28A of a torsion spring 28 that continually urges the door 30 in the closing direction of the opening 20 is fitted to the support shaft 26.

Namely, the wound portion 28A of the torsion spring 28 is attached to the support shaft 26 by being fitted to the narrower-diameter boss 26B in a state where the wound portion 28A is retained between the lowermost rotating sliding portion 32 and the intermediate rotating sliding portion 32. One end portion of the torsion spring 28 is attached to a screw boss 38 (screw boss disposed in the lower case 16) of the case 12, and the other end portion of the torsion spring 28 is attached to a right-side edge end portion of the protruding portion 36.

The reel 40 is molded using a resin material. As described above, the reel 40 is configured by the bottomed cylinder-shaped reel hub 42, the upper flange 44 that integrally extends from the upper end portion of the reel hub 42, and the lower flange 46 that is attached by welding or the like to the lower end portion of the reel hub 42. Thus, the reel hub 42 and the lower flange 46 are molded using mutually compatible resin materials, and can be easily welded together using ultrasonic waves or the like.

Also, the distance between the upper flange 44 and the lower flange 46 is substantially the same as the width of the recording tape T, so that the width-direction position of the recording tape T wound onto the reel hub 42 is regulated.

As shown in FIGS. 2 and 3, a bottom wall 48 is disposed at the lower flange 46 side of the reel hub 42. A through hole 48A is disposed in the axial center (core) portion of the bottom wall 48. A reel gear 50 is annularly formed at the undersurface side of the bottom wall 48.

The reel gear 50 is configured to be exposed through a circular gear opening 18 disposed in a substantial center of the lower case 16 as a result of the reel 40 being pushed towards the lower case 16 by the urging force of a compression coil spring 78. The reel gear 50 is configured to mesh with a drive gear 102 disposed on a rotating shaft 100 of the drive device and transmit rotational force to the reel 40.

An annular reel plate 52 comprising a magnetic material is integrally fixed, using insert molding or the like, to the radial-direction inner side of the reel gear 50. In a state where the drive gear 102 and the reel gear 50 are completely meshed together, the reel plate 52 is attracted by the magnetic force of an annular magnet 106 disposed between the drive gear 102 and a later-described release protrusion 104, so that axial shifting between the reel 40 and the rotating shaft 100 is prevented and the meshed state between the reel gear 50 and the drive gear 102 is retainable. As a result of this configuration, when the rotating shaft 100 rotates around the axial center thereof, the reel 40 rotates integrally with the rotating shaft 100 inside the case 12.

Figure 4:
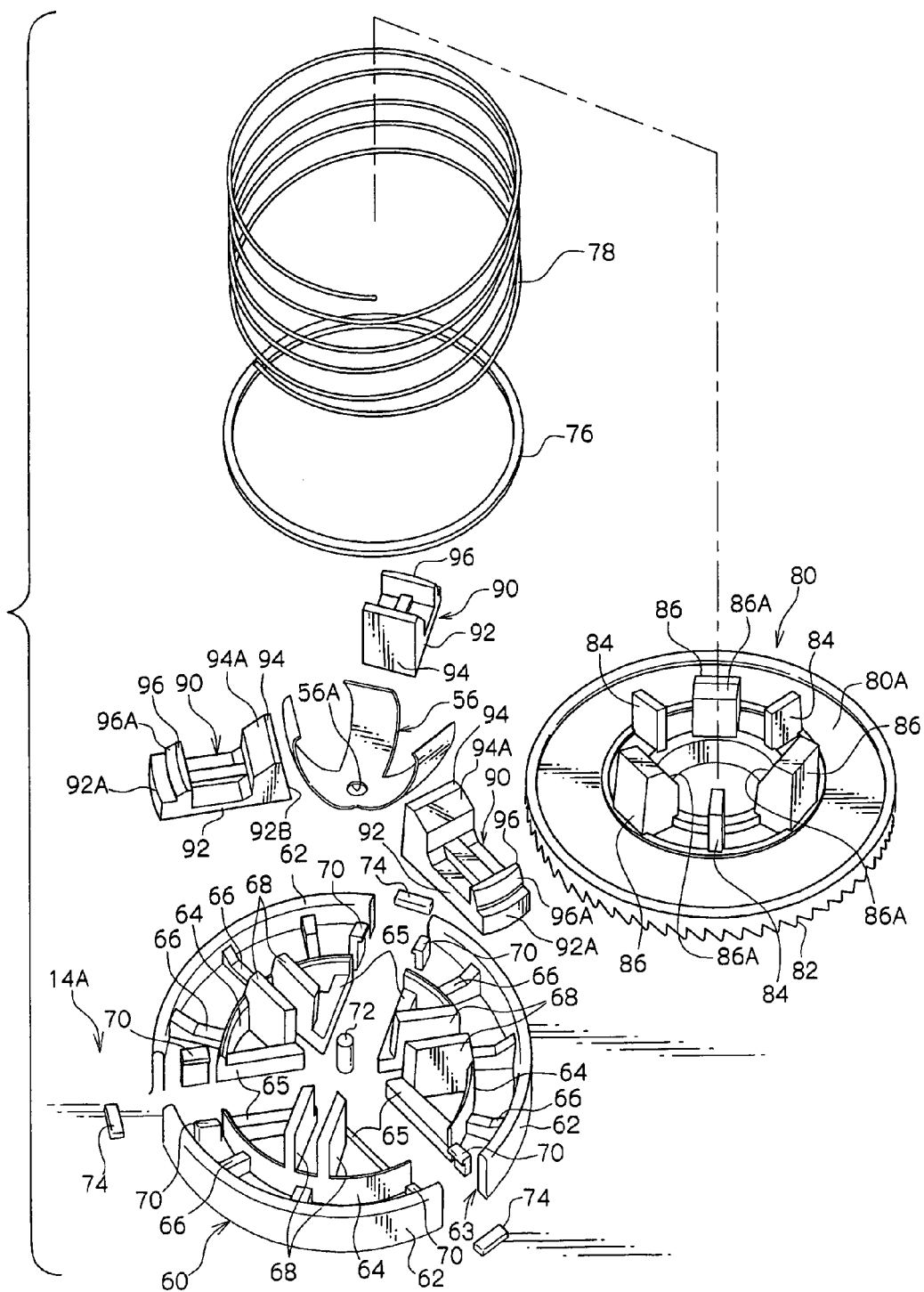
FIG. 4 is a schematic exploded perspective view showing the configuration of an attachment portion formed in an upper case.

An engagement gear 54 is annularly formed in the upper surface side of the bottom wall 48 of the reel hub 42. The engagement gear 54 is configured to mesh with a brake gear 82 of a brake member 80. As shown in FIG. 4, the brake member 80 is formed in a disc shape and is housed inside the reel hub 42 so as to be movable up and down (i.e., so as to be movable in the axial direction of the reel 40). The brake gear 82 is annularly disposed at the outer peripheral portion of the undersurface of the brake member 80.

Plural (three in the present example) tabular guide portions 84, which are inserted between guide wall portions 68 (described later) of the upper case 14, and the same number (i.e., three) of substantially prismatic engagement protrusions 86, which engage with cam portions 94 of plural (three in the present example) lock portions 90 (described later), are alternately disposed at equidistant intervals on the upper surface of the brake member 80.

Radial-direction inner sides of the engagement protrusions 86 are formed as tapered surfaces 86A that slant at an angle of 30° to 60°, and preferably 45°. The tapered surfaces 86A are configured to engage with tapered surfaces 94A formed at the cam portions 94 of the lock members 90.

An flat surface 80A is annularly formed at the outer side of the guide portions 84 and engagement protrusions 86 on the upper surface of the brake member 80. When the recording tape cartridge 10 (i.e., the case 12) has been assembled, the lower end of the compression coil spring 78 serving as an urging member abuts against the flat surface 80A.

A substantially columnar operational protrusion 88, which is passable through the through hole 48A, is disposed in the center of the undersurface of the brake member 80. The operational protrusion 88 is configured to be contactable with the release protrusion 104 disposed in the axial center portion of the rotating shaft 100 of the drive device (see FIGS. 2 and 3). As shown in the drawings, the height of the operational protrusion 88 is configured such that the operational protrusion 88 does not project downward from the through hole 48A (i.e., from the bottom wall 48), i.e., such that the operational protrusion 88 is positioned inside the through hole 48. Thus, the brake member 80 is prevented from being inadvertently moved upward.

Figure 5:
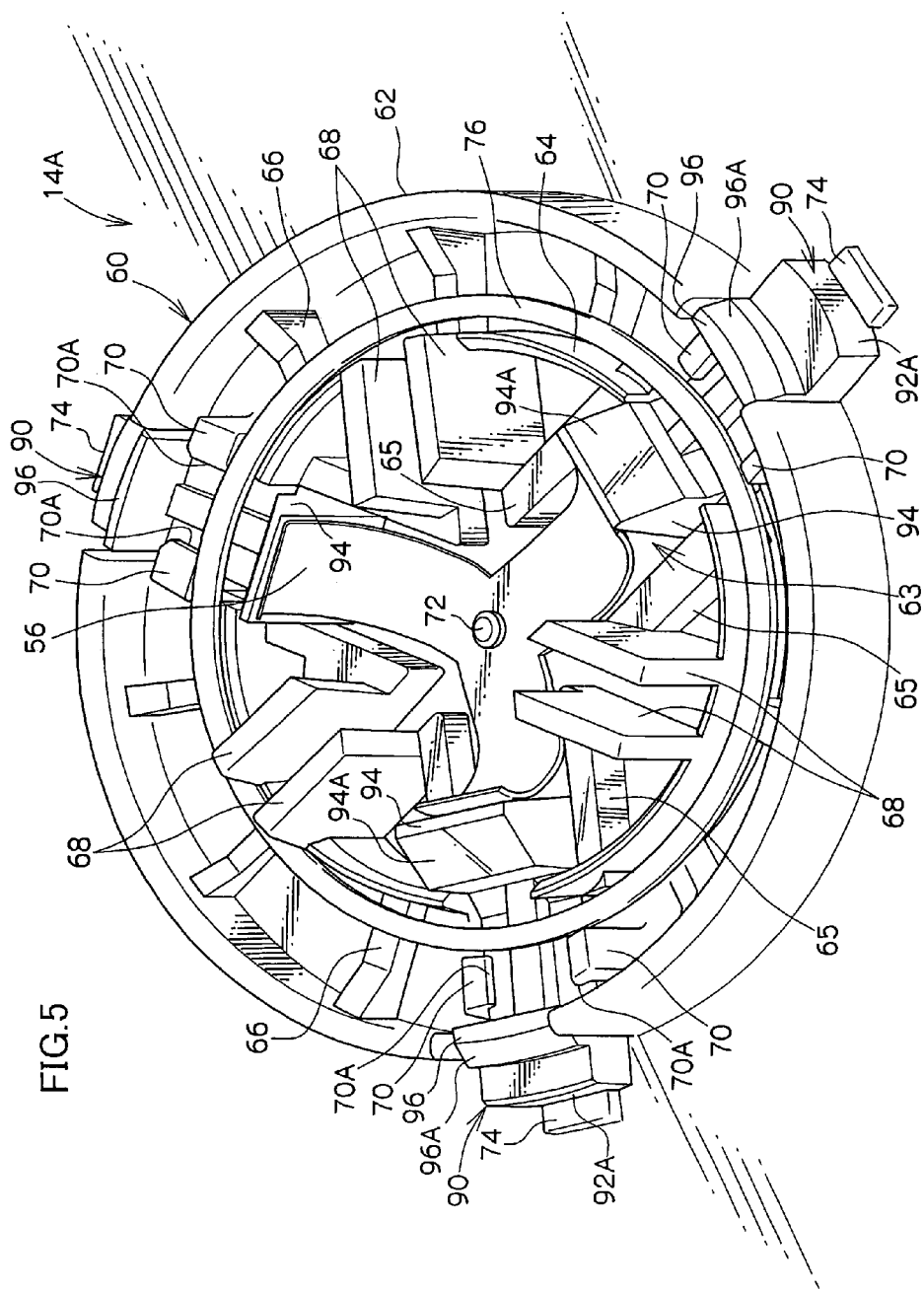
FIG. 5 is a schematic perspective view showing the attachment portion formed in the upper case.

As shown in FIGS. 4 and 5, an attachment portion 60 is formed in the substantial center (i.e., on the axial center portion of the reel hub 42) of the inner surface of the top plate 14A of the upper case 14. The attachment portion 60 slidably houses plural (e.g., three) lock members 90 that engage with the upper edge portion of the reel hub 42 from the inner peripheral surface side thereof to prevent the movement of the reel 40 in the axial direction (i.e., up and down).

The attachment portion 60 includes two cylindrical walls 62 and 64 that are concentric when seen in plan view. The outer-side cylindrical wall 62 is higher than the inner-side cylindrical wall 64. Portions of the cylindrical walls 62 and 64 are cut out at appropriate positions (three equidistant places), and guide ribs 65 are disposed, at those cutout sites, along the radial direction at the inner side of the cylindrical wall 64. The lock members 90 are housed inside housing portions 63 configured by the spaces between the guide ribs 65. The lock members 90 are configured to be slidable in the radial direction inside the housing portions 63.

Plural (nine in the present example) tabular support ribs 66 that connect the cylindrical walls 62 and 64 are disposed along the radial direction between the cylindrical walls 62 and 64. The guide wall portions 68 are disposed between the housing portions 63 and at the inner side of the cylindrical wall 64. Two guide wall portions 68 form one set into which one guide portion 84 of the brake member 80 is inserted, and the number of sets of guide wall portions 68 is the same as the number of guide portions 84.

As shown in FIGS. 4 and 5, the guide wall portions 68 are disposed along the radial direction so that outer end surfaces of the guide wall portions 68 are flush with the outer peripheral surface of the cylindrical wall 64. The distance between the two guide wall portions 68 in each set is the same as, or slightly larger than, the plate thickness of the guide portion 84 inserted therein.

Figure 6:
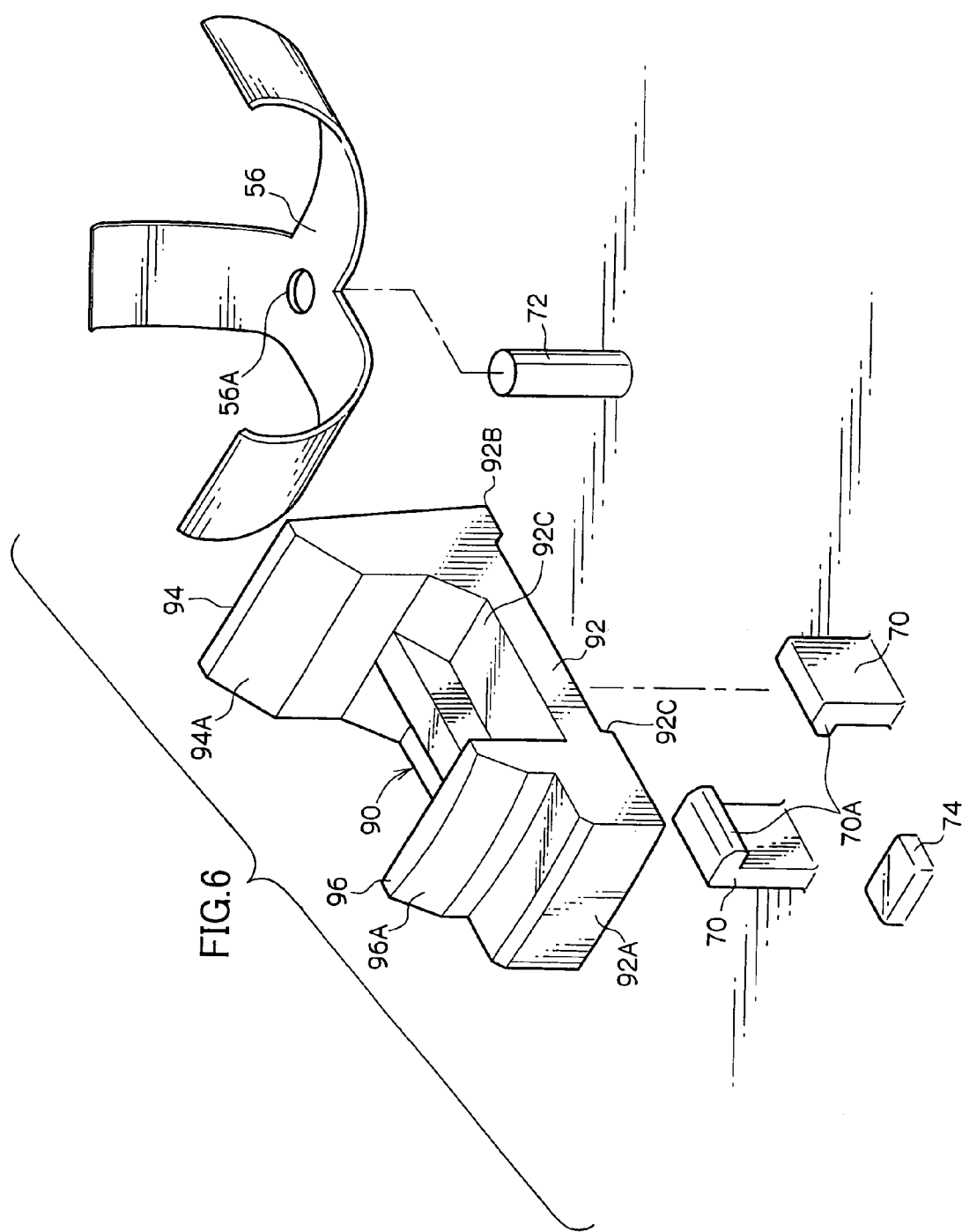
FIG. 6 is a schematic perspective view showing a lock member and a plate spring.
Figure 7:
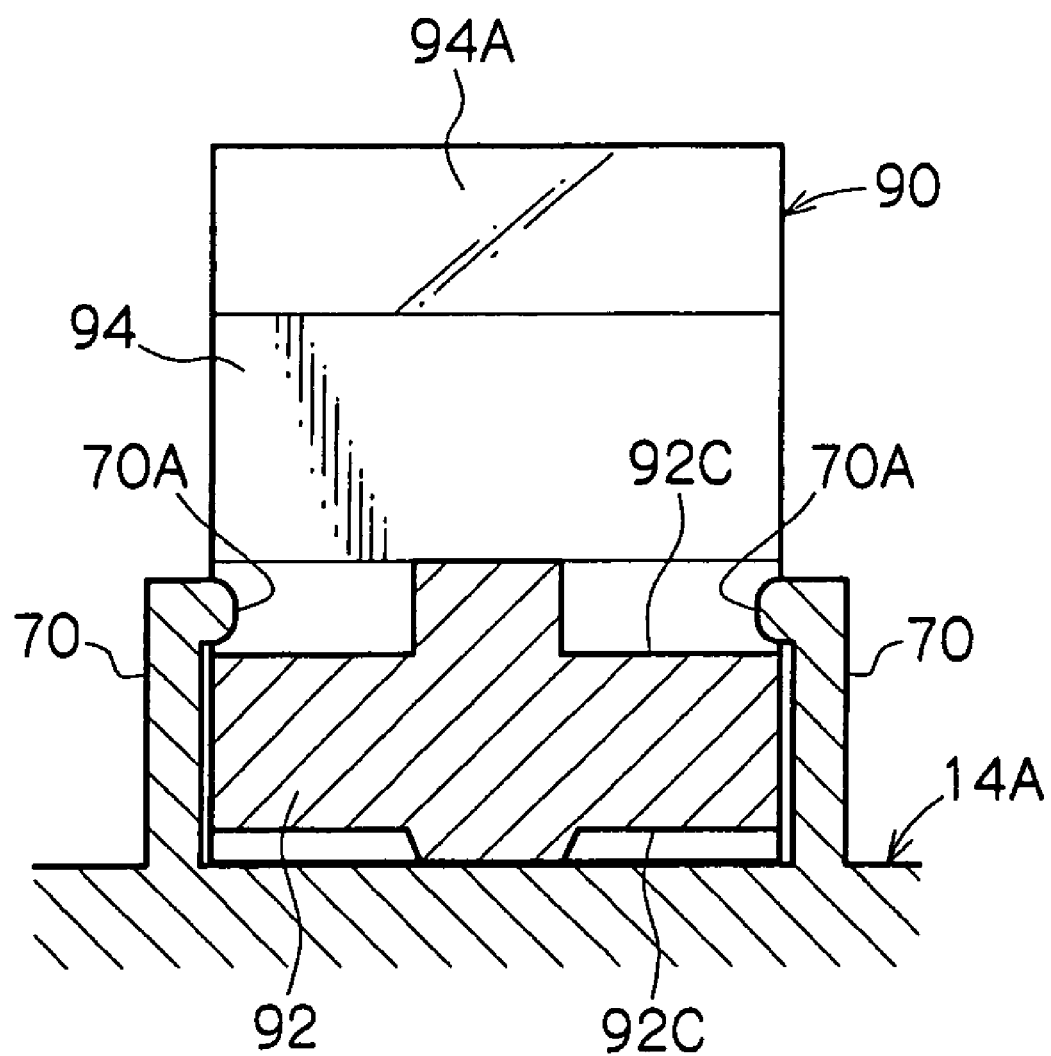
FIG. 7 is a schematic perspective view of the lock member retained in retention portions.

Pairs of retention portions 70 that slidably retain (with a minute gap) the lock members 90 are disposed between the cylindrical walls 62 and 64 and at both sides (on lines extending from the guide ribs 65) of the housing portions 63. As shown in FIGS. 6 and 7, undercut portions 70A are formed at distal ends (lower ends) of the retention portions 70. The undercut portions 70A serve as projecting portions that project inward (i.e., towards the lock member 90) towards each other.

The undercut portions 70A are configured to provisionally hold the lock members 90 so that, after the lock members 90 have been incorporated, when at least the upper case 14 is turned over so that the inner surface of the top plate 14A faces downward and covers the lower case 16 (i.e., when the case 12 is assembled), the lock members 90 do not fall out (come out) of the attachment portion 60 (i.e., the housing portions 63).

Namely, when the undercut portions 70A are molded in a die, the undercut portions 70A project inward to the extent that they are removable from the die (about 0.1 mm to about 0.5 mm, and preferably about 0.3 mm). Moreover, the undercut portions 70A are formed in substantially arced shapes when seen in side sectional view so that they can be easily removed. The retention portions 70 are formed so that the height thereof is about 4 mm, the plate thickness thereof is about 0.35 mm to about 1.2 mm, and preferably from about 0.5 mm to about 0.8 mm.

The retention portions 70 may be integrally molded with the upper case 14, or may be molded separately and fixed to the upper case 14. However, when the retention portions 70 are configured so that they are molded separately and fixed to the upper case 14, it becomes possible to assemble the case 10 after the lock members 90 are disposed in the upper case 70A. Thus, there is the effect that it becomes possible to mold the undercut portions 70 to have a shape that projects even more or to have a gate shape (substantial "U" shape), and a later-described stopper 76 becomes unnecessary.

A caulking-use pin 72 for attaching a plate spring 56 is disposed in the substantial center of the inner surface of the top plate 14A (i.e., in the center of the attachment portion 60 on the axial center line of the reel hub 42). The plate spring 56 is formed so that it branches into three (three blades) from the center and abuts against radial-direction inner side surfaces of the cam portions 94 of the lock members 90. A caulking-use hole 56A is disposed in the center portion of the plate spring 56.

Thus, the plate spring 56 is attached to the upper case 14 by inserting the caulking-use pin 72 of the upper case 14 into the caulking-use hole 56A and caulking (crashing) the caulking-use pin 72 on the caulking-use hole 56A. It is preferable to dispose the plate spring 56 serving as urging means in the substantial center of the inner surface of the top plate 14A (i.e., the center of the attachment portion 60) because the dead space inside the case 12 is effectively used and the urging means can be compactly configured. Additionally, the lock members 90 are continually urged, by the plate spring 56, outward in the radial direction from the center of the attachment portion 60 (i.e., the center of the reel 40).

Stopper ribs 74 are disposed on the top plate 14A on lines extending from the housing portions 63 and at predetermined positions at the outer side of the cylindrical wall 62 (i.e., positions where later-described tension acts to a certain extent). The stopper ribs 74 serve as position regulating means that temporarily stop (i.e., until the upper case 14 covers the lower case 16) the lock members 90 urged by the plate spring 56 when the lock members 90 and the plate spring 56 are incorporated.

Thus, because the lock members 90 are retained by the plate spring 56 and the stopper ribs 74 in a state where a certain amount of tension is applied, the lock members 90 are further prevented from falling out. It will be noted that because the plate spring 56 is attachable even after the later-described stopper 76 is welded to the support ribs 66, the incorporation of the plate spring 56 can be done simply and excellently.

The annular stopper 76 is welded, using ultrasonic waves or the like, to the support ribs 66 after the lock members 90 are provisionally held and retained by the retention members 70. The stopper 76 is made of resin and serves as a fallout prevention member that holds and retains the lock members 90 so that the lock members 90 do not fall out even if they slide.

Figure 8:
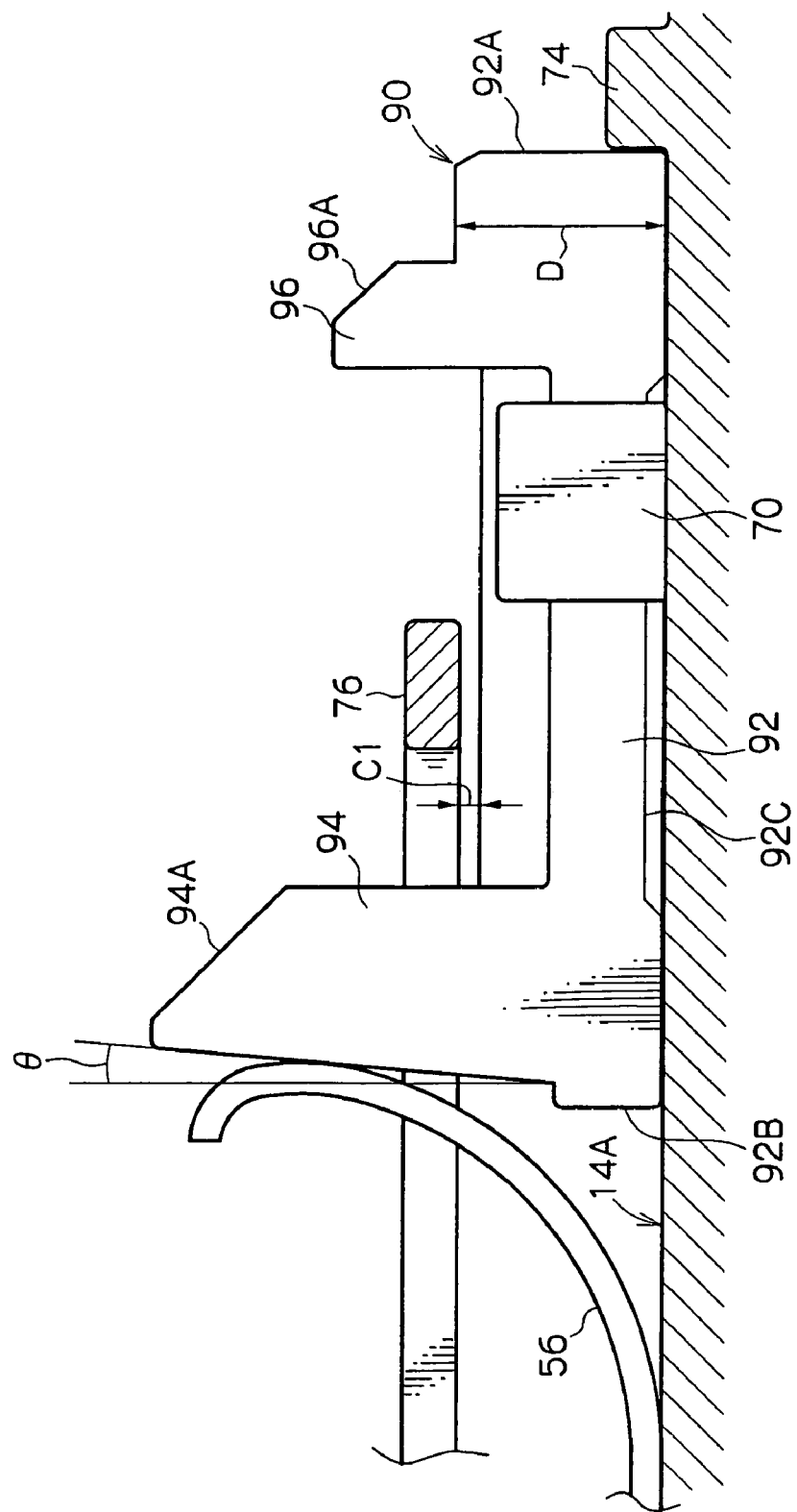
FIG. 8 is a schematic side view of the lock member retained in the retention portions.

As shown in FIG. 8, a predetermined clearance C1 (C1=about 0.05 mm to about 0.4 mm) is secured between the stopper 76 and the lock members 90 so that the stopper 76 does not become an obstruction when the lock members 90 slide. The height of the support ribs 66 is regulated so that this clearance C1 is secured.

The upper end of the compression coil spring 78 abuts against the stopper 76 when the recording tape cartridge 10 is assembled (i.e., when the upper case 14 covers the lower case 16). The compression coil spring 78 is retained between the stopper 76 (i.e., the upper case 14) and the flat surface 80A (i.e., the brake member 80). It will be noted that the upper end of the compression coil spring 78 does not have to abut against the stopper 76, and may abut against the support ribs 66.

However, when the invention is configured so that the upper end of the compression coil spring 78 abuts against the stopper 76, there is the effect that the stopper 76 does not have to be welded to the support ribs 66. Moreover, the stopper 76 is not limited to the annular shape shown in the drawings; it suffices as long as the stopper 76 spans the distance between the support ribs 66 at both sides of each of the lock members 90 so that the stopper 76 can continually prevent the lock members 90 from falling out.

Figure 9:
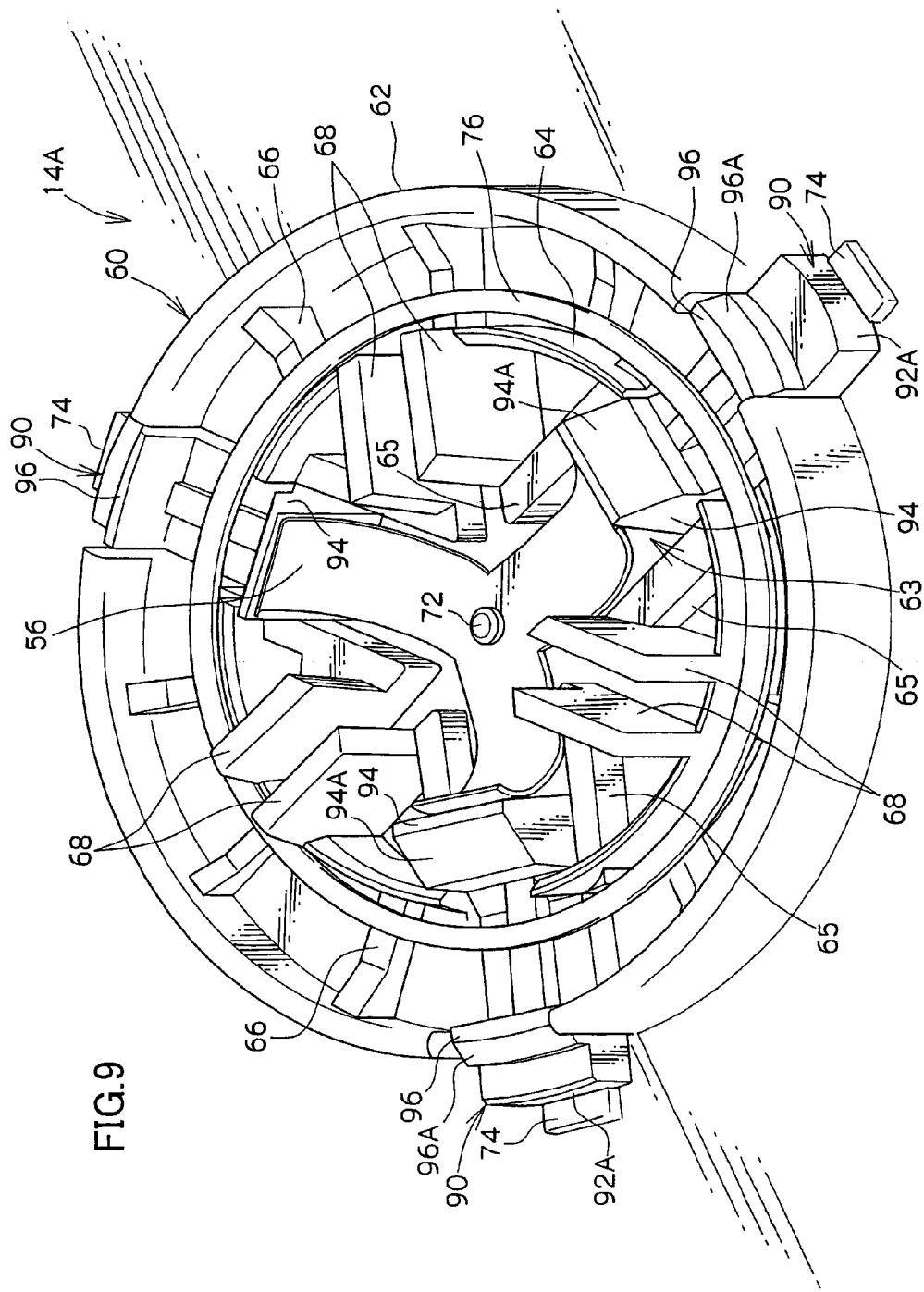
FIG. 9 is a schematic perspective view showing the attachment portion without the retention portions.
Figure 10:
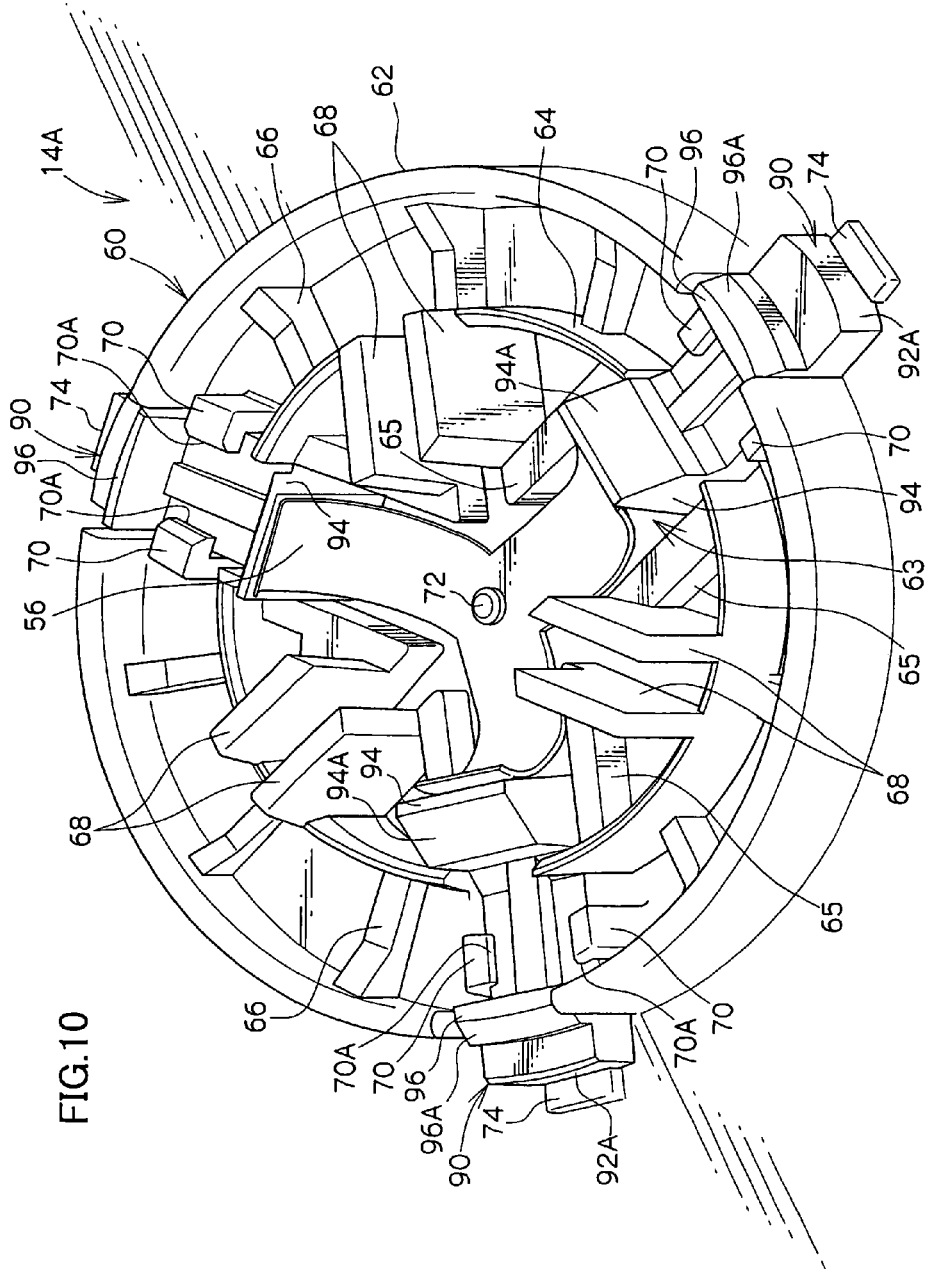
FIG. 10 is a schematic perspective view showing the attachment portion without a stopper.

The invention may also have a configuration where only the stopper 76 is disposed and the retention portions 70 are omitted, as shown in FIG. 9, or have a configuration where the stopper 76 is omitted and only the retention portions 70 are disposed, as shown in FIG. 10.

The lock members 90 are retained, so as to be slidable in the radial direction within the housing portions 63, in a state where they are prevented from falling out by the retention portions 70 and the stopper 76, and include substantially prismatic body portions 92 that slidingly contact the inner surface of the top plate 14A of the upper case 14. The substantially prismatic cam portions 94, which have the same width as that of the body portions 92, are integrally disposed in a substantial axial direction of the reel 40 at end portions 92B at the radial-direction inner sides of the body portions 92.

As shown in FIG. 8, the cam portions 94 are disposed at a predetermined height so that they slant at a predetermined angle θ outward with respect to the body portions 92. In a state where end portions 92A at the radial-direction outer sides of the lock members 90 (i.e., the body portions 92) are stopped by the stopper ribs 74, the cam portions 94 cause the urging force of the plate spring 56 to be divided towards the upper case 14. Thus, at the time the lock members 90 are incorporated, they are further prevented from falling out from the housing portions 63, whereby their incorporability is improved.

Outer sides of lower end surfaces of the cam portions 94 serve as tapered surfaces (cam surfaces) 94A that slant at an angle of 30° to 60°, and preferably 45°. The tapered surfaces 94A are configured to engage with the tapered surfaces 86A of the engagement protrusions 86 of the brake member 80. Because the engagement protrusions 86 and the cam portions 94 are both formed in substantially prismatic shapes, their rigidity is high and they are appropriately engageable.

A thickness D (see FIG. 8) of the end portions 92A at the radial-direction outer sides of the lock members 90 (i.e., the body portions 92) is substantially the same as a distance W (see FIG. 2) between the upper surface of the upper flange 44 and the inner surface of the top plate 14A when the reel 40 is positioned at its lowermost position inside the case 12.

Engagement portions 96 that have a predetermined height and engage with the upper edge portion of the reel hub 42 are integrally (vertically) disposed in the axial direction of the reel 40 in the vicinity of the end portions 92A at the radial-direction outer sides of the body portions 92. The engagement portions 96 have the same width as that of the body portions 92 and are shorter than the cam portions 94. Outer sides of lower end surfaces of the engagement portions 96 serve as tapered surfaces 96A that slant at a predetermined angle. The outer side surfaces including the tapered surfaces 96A are arced surfaces that match the inner peripheral surface of the reel hub 42 when seen in plan view.

Thus, the lock members 90 stopped by the stopper ribs 74 are configured so that when the recording tape cartridge 10 is assembled (i.e., when the upper case 14 covers the lower case 16), the engagement portions 96 easily engage with the upper edge portion of the reel hub 42 in accompaniment with the assembly operation. After engagement, as shown in FIG. 2, the end portions 92A at the radial-direction outer sides of the body portions 92 separate from the stopper ribs 74.

At this time, because the outer side surfaces of the engagement portions 96 excluding the tapered surfaces 96A abut against the inner peripheral surface of the reel hub 42 (i.e., push against the inner peripheral surface), it is preferable for the draft angle from the die, of the inner peripheral surface of the reel hub 42, to be 0°. When the draft angle is larger than 0°, there is the potential for the pushing force of the engagement portions 96 to decrease and for the lock members 90 to no longer function properly because the upper edge portion of the reel hub 42 spreads outward (i.e., the diameter of the upper edge portion becomes larger).

Figure 11:
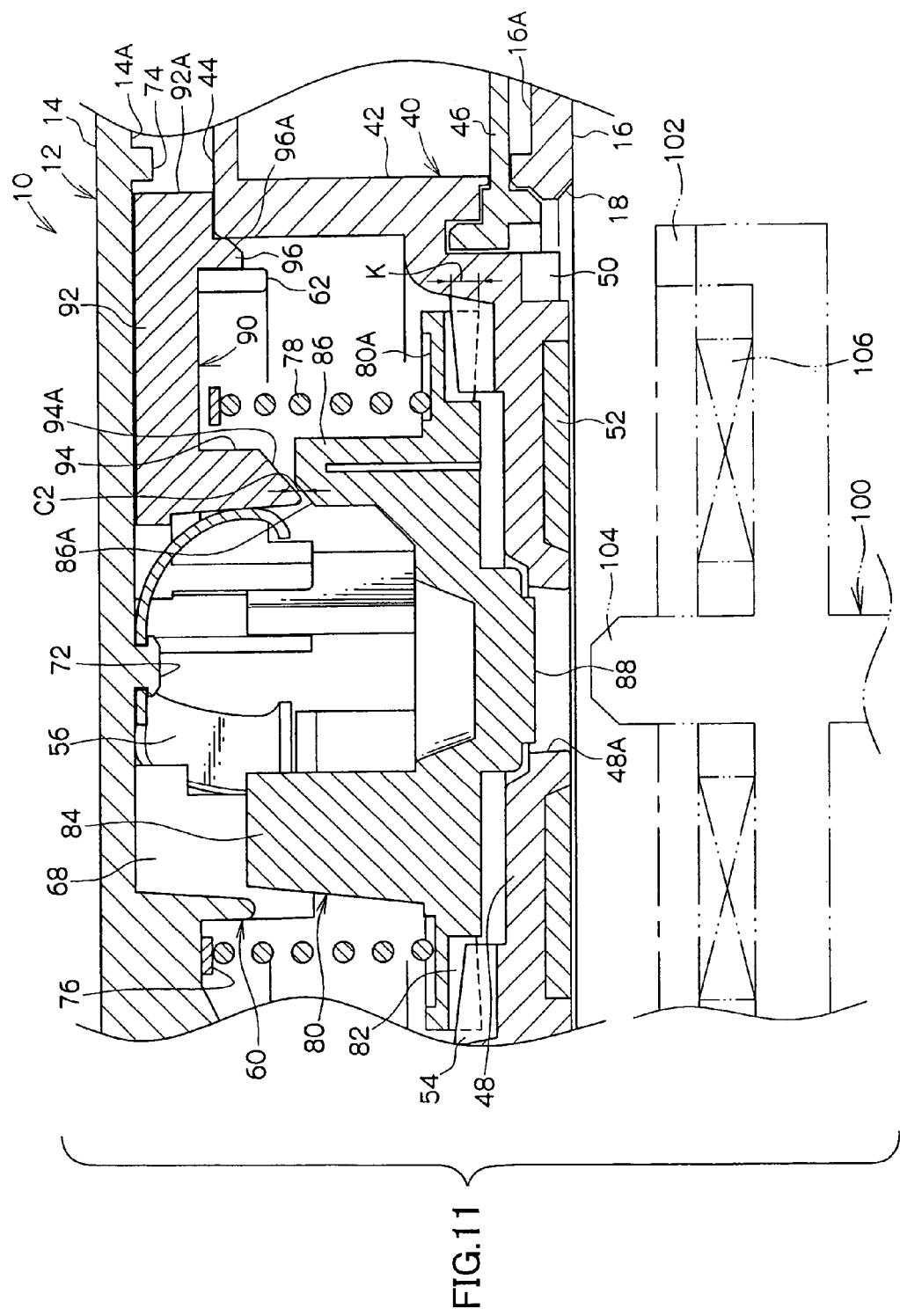
FIG. 11 is a partially enlarged schematic side sectional view of the recording tape cartridge prior to the rising of the rotating shaft.

According to the above configuration, as shown in FIG. 11, when the recording tape cartridge 10 is not in use, the brake member 80 is urged downward by the urging force of the compression coil spring 78, and the lock members 90 are urged outward in the radial direction by the urging force of the plate spring 56. At this time, the rotation of the brake member 80 with respect to the case 12 is prevented by the guide portions 84 inserted in the guide wall portions 68, and inadvertent rotation of the reel 40 is prevented as a result of the brake gear 82 of the brake member 80 strongly meshing with the engagement gear 54 inside the reel hub 42.

Then, the engagement portions 96 of the lock members 90 engage with the upper edge portion of the reel hub 42. That is, the outer side surfaces of the engagement portions 96 excluding the tapered surfaces 96A push against the inner peripheral surface of the reel hub 42, and the end portions 92A of the body portions 92 further outward in the radial direction from the engagement portions 96 are intervened between the upper surface of the upper flange 44 and the inner surface of the top plate 14A (i.e., the lower surfaces of the end portions 92A contact the upper surface of the upper flange 44 or face the upper surface of the upper flange 44 with an extremely minute gap therebetween), whereby the reel 40 is prevented from rising when the recording tape cartridge 10 is not in use.

Here, when the recording tape cartridge 10 is not in use, the engagement protrusions 86 and the cam portions 94 are not in contact with each other so that the component force of the plate spring 56 does not act on the brake member 80. Additionally, a clearance C2 between the opposing tapered surfaces 86A and 94A in the axial direction of the reel 40 (moving direction of the brake member 80) is of course smaller than a meshing amount K between the brake gear 82 and the engagement gear 54. The reason for this is because, if the clearance C2 is larger than the meshing amount K, the brake member 80 will easily rise by the clearance C2 amount due to an impact of dropping or the like, whereby the reel 40 inadvertently becomes rotatable.

Thus, the clearance C2 between the engagement protrusions 86 and the cam portions 94 is extremely minute, and the distance between the undersurfaces of the outer side end portions 92A of the body portions 92 and the upper surface of the upper flange 44 is either substantially the same as the clearance C2 or smaller (i.e., so that the outer side end portions 92A substantially contact the upper surface of the upper flange 44). Thus, the reel 40 and the brake member 80 are substantially incapable of rising (i.e., immovable in the axial direction of the reel 40) when the recording tape cartridge 10 is not in use.

Figure 12:
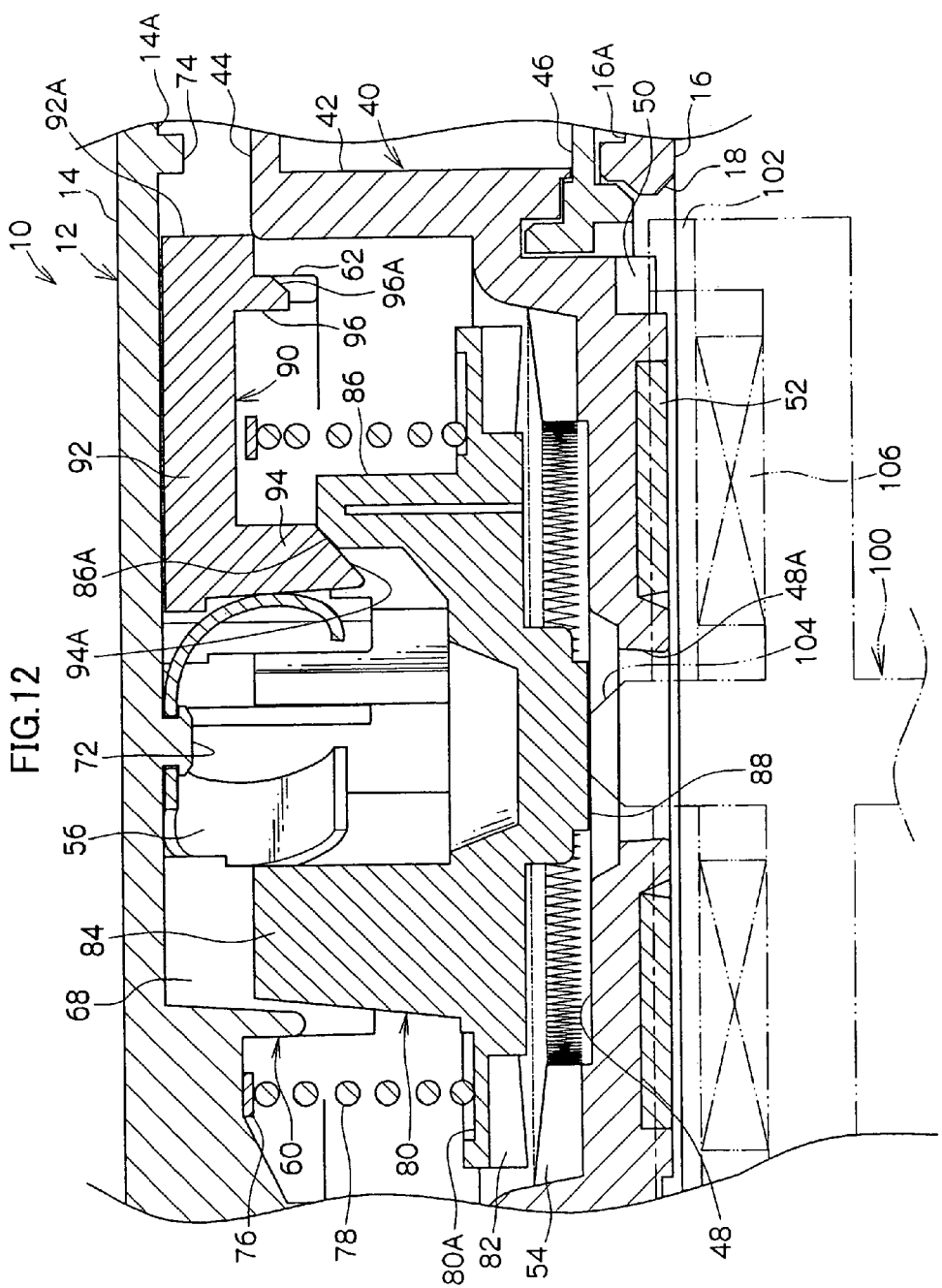
FIG. 12 is a partially enlarged schematic side sectional view of the recording tape cartridge as the rotating shaft is ascending.
Figure 13:
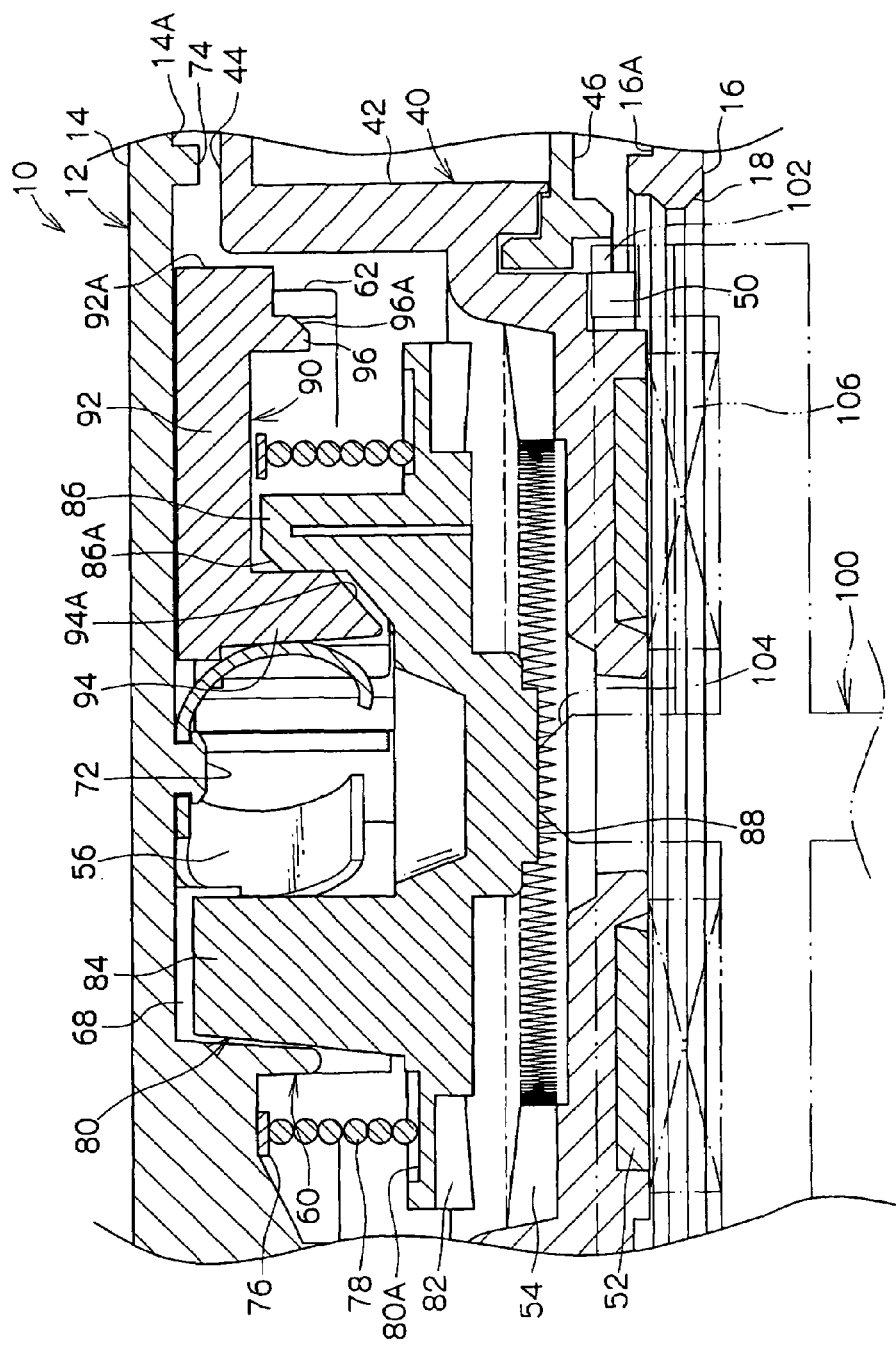
FIG. 13 is a partially enlarged schematic side sectional view of the recording tape cartridge after the rising of the rotating shaft.

When the recording tape cartridge 10 is in use, as shown in FIG. 12, the release protrusion 104 abuts against the operational protrusion 88, so that the brake member 80 rises a predetermined height counter to the urging force of the compression coil spring 78. Thus, the tapered surfaces 86A of the engagement protrusions 86 and the tapered surfaces 94A of the cam portions 94 abut against each other, the tapered surfaces 94A slide on the tapered surfaces 86A, and as shown in FIG. 13, the cam portions 94 enter the inner sides of the engagement protrusions 86.

In other words, when the brake gear 82 disengages from the engagement gear 54, the lock members 90 slide inward in the radial direction counter to the urging force of the plate spring 56, the outer side surfaces of the engagement portions 96 separate from the inner peripheral surface of the reel hub 42, and the outer side end portions 92A of the body portions 92 move out from between the upper surface of the upper flange 44 and the inner surface of the top plate 14A (i.e., the undersurfaces of the end portions 92A separate from the upper surface of the upper flange 44). Thus, the reel 40 becomes rotatable and risible a predetermined height inside the case 12.

It will be noted that when the brake member 80 has risen, the cam portions 94 enter the inner sides of the engagement protrusions 86, only the outer side surfaces of the cam portions 94 abut against the inner side surfaces of the engagement protrusions 86 and, at this time, the upper end surfaces of the engagement protrusions 86 do not abut against the lock members 90, and the lower end surfaces of the cam portions 94, do not abut against the brake member 80.

The draft angle from the die, of both the inner side surfaces of the engagement protrusions 86 and the outer side surfaces of the cam portions 94, is 0°. For this reason, the pushing force (urging force) with which the lock members 90 are pushed by the plate spring 56 is received by the inner peripheral surfaces of the engagement protrusions 86, and a component force pushing the brake member 80 downward is not generated.

In other words, at the time the reel 40 rotates, the pushing force (urging force) resulting from the plate spring 56 acts only in the radial direction of the reel 40, and does not act (is not transmitted) in the axial direction (vertical direction) of the reel 40. For this reason, the lock members 90 are stably retained in an unlocked state. Additionally, because the pushing force (urging force) in the axial direction (vertical direction) of the reel 40 is, similar to what has conventionally been the case, only the urging force of the compression coil spring 78, the invention can be configured so that an unnecessary load does not act in the axial direction (vertical direction) of the rotating shaft 100 even if the plate spring 56 is disposed.

As shown in FIGS. 7 and 8, with respect to the body portions 92 of the lock members 90, it is preferable to form concave portions 92C (or convex portions) in the upper surface contacting the inner surface of the top plate 14A of the upper case 14 and the lower surface contacting the stopper 76. When such concave portions 92C (or convex portions) are formed, it becomes possible for the lock members 90 to slide with little resistance because the contact area between the inner surface of the top plate 14A of the upper case 14 and the stopper 76 can be reduced.

Next, the action of the recording tape cartridge 10 having the above configuration will be described. When the recording tape cartridge 10 is not in use (i.e., when it has not been loaded into the drive device), the door 30 closes off the opening 20 as a result of the urging force of the torsion spring 28. Also, the projecting portions 22B of the leader tape 22 are housed (inserted) and retained inside the recessed housing portions 24, whereby the leader tape 22 is disposed along the left side wall 12B.

As shown in FIGS. 2 and 11, the reel 40 is urged downward by the compression coil spring 78 via the brake member 80. In other words, due to the urging force of the compression coil spring 78, the brake gear 82 of the brake member 80 strongly meshes with the engagement gear 54 inside the reel hub 42, and inadvertent rotation of the reel 40 is prevented.

Also, due to the urging force of the plate spring 56, the lock members 90 are urged outward in the radial direction from the center of the attachment portion 60 (i.e., the center of the reel 40), and the engagement portions 96 engage with the upper edge portion of the reel hub 42.

Namely, the outer side surfaces of the engagement portions 96 excluding the tapered surfaces 96A push against the inner peripheral surface of the reel hub 42, and the end portions 92A of the body portions 92 further outward in the radial direction from the engagement portions 96 are intervened between the upper surface of the upper flange 44 and the inner surface of the top plate 14A (i.e., the lower surfaces of the end portions 92A contact the upper surface of the upper flange 44 or face the upper surface of the upper flange 44 with an extremely minute gap therebetween).

Here, because the thickness D of the outer side end portions 92A of the lock members 90 (i.e., the body portions 92) is substantially the same as the distance W between the upper surface of the upper flange 44 and the inner surface of the top plate 14A when the reel 40 is positioned at its lowermost position inside the case 12, the reel 40 is prevented from rising due to the lock members 90.

In other words, the reel 40 does not rise even if an impact is applied to the recording tape cartridge as a result of dropping thereof or the like. Thus, drawbacks such as the brake member 80 slanting and getting caught (falling) do not arise, and drawbacks such as the outer peripheral edges of the upper flange 44 and lower flange 46 striking the inner surface of the case 12 and becoming deformed do not arise. Thus, the recording tape T is not adversely affected.

When data is to be recorded on the recording tape T of the recording tape cartridge 10, or when data recorded on the recording tape T of the recording tape cartridge 10 is to be played back, the recording tape cartridge 10 is loaded into a drive device (not shown). Namely, the recording tape cartridge 10 is inserted, from the front wall 12A side thereof, into a loading port (not shown) of the drive device.

In accompaniment with this loading, the open/close member (not shown) of the drive device relatively approaches and abuts against the right end portion of the door 30 (the door portion which is located on the right-hand side of the support shaft 26), and pushes the right end portion of the door 30. When this happens, the door 30 rotates around the support shaft 26 counter to the urging force of the torsion spring 28 and opens up the opening 20.

At this time, a gap of about 0.3 mm to about 0.5 mm is formed by the annular convex portions 34 between the upper end surface 30A of the door 30 and the upper case 14, and between the lower end surface 30B of the door 30 and the lower case 16. In other words, the only parts of the door 30 that contact the upper case 14 and the lower case 16 are the annular convex portions 34. Thus, the door 30 can rotate with little sliding resistance.

With respect to the door 30, it is preferable for at least the rotating sliding portions 32 and the annular convex portions 34 to be molded using an olefin resin such as POM. In this case, the sliding resistance experienced by the annular convex portions 34 with respect to the upper case 14 and the lower case 16, which are molded using a resin such as PC, can be further reduced and the sliding resistance experienced by the rotating sliding portions 32 with respect to the support shaft 26 can also be reduced.

The wound portion 28A of the torsion spring 28 is disposed between the rotating sliding portions 32. Thus, when the rotating sliding portions 32 are molded using an olefin resin such as POM, the rotating sliding portions 32 are more resistant to abrasion than the case 12 which is molded using a resin such as PC. In other words, because it becomes difficult for abrasion powder to arise even when the wound portion 28A of the torsion spring 28 slides as a result of the rotation of the door 30, the recording tape T is not adversely affected.

In any event, when the door 30 rotates and the opening 20 is opened, the pullout member (not shown) of the drive device approaches the opening 20 from the left side wall 12B side and engages with the hole portion 22A of the leader tape 22. At this time, because the leader tape 22 stands by in a state where it is in proximity to the left side wall 12B, the pullout member can reliably engage with the hole portion 22A.

Then, when the pullout member engages with the hole portion 22A, the pullout member separates from the opening 20, whereby the leader tape 22 is pulled out from the inside the case 12. The leader tape 22 pulled out from the inside of the case 12 is then wound onto a take-up reel (not shown) of the drive device.

As shown in FIG. 12, the rotating shaft 100 of the drive device enters the case 12 through the gear opening 18 and approaches the bottom wall 48 of the reel 40. Namely, the release protrusion 104 pushes the operational protrusion 88 and causes the brake member 80 to rise. Then, the engagement gear 54 disengages from the brake gear 82, but prior to this, the engagement protrusions 86 abut against the cam portions 94 of the lock members 90 and push the cam portions 94 upward.

Then, the tapered surfaces 94A of the cam portions 94 slide on the tapered surfaces 86A of the engagement protrusions 86, and the lock members 90 slide inward in the radial direction on the inner surface of the top plate 14A (i.e., inside the housing portions 63) counter to the urging force of the plate spring 56. At this time, the lock members 90 can slide with little resistance because the concave portions 92C are formed in the body portions 92. The lock members 90 can also stably slide without falling out of the housing portions 63 (i.e., the attachment portion 60) due to the stopper 76.

Then, when the lock members 90 slide inward in the radial direction inside the housing portions 63, the outer side surfaces of the engagement portions 96 of the lock members 90 separate from the inner peripheral surface of the reel hub 42, and the outer side end surfaces 92A of the body portions 92 move out from the between the upper surface of the upper flange 44 and the inner surface of the top plate 14A (i.e., the undersurfaces of the end portions 92A separate from the upper surface of the upper flange 44).

Then, as shown in FIGS. 3 and 13, the cam portions 94 enter the inner sides of the engagement protrusions 86, whereby the outer side end portions 92A of the body portions 92 are disposed at the inner side of the reel hub 42 and the outer side surfaces of the cam portions 94 abut against the inner side surfaces of the engagement protrusions 86. Thus, the engagement portions 96 disengage from the upper edge portion of the reel hub 42, and the lock members 90 are retained in an unlocked state.

Then, the rotating shaft 100 rises, whereby the drive gear 102 meshes with the reel gear 50 and the reel plate 52 is attracted to the magnet 106. When the drive gear 102 meshes with the reel gear 50, the reel 40 rises to a predetermined height inside the case 12 and become rotatable, and the drive gear 102, i.e., the reel 40 is rotatingly driven in synchronous with the take-up reel, whereby the recording tape T is sequentially sent to the drive device. Then, recording of data to the recording tape T, or playback of data recorded on the recording tape T, is conducted with the recording/playback head (not shown) of the drive device.

When the recording tape cartridge 10 is to be removed from the drive device, first the drive gear 102 is rotated in reverse and the recording tape T is rewound onto the reel 40. Then, the leader tape 22 is removed from the take-up reel and returned to the inside of the case 12 through the opening 20. In other words, the projecting portions 22B of the leader tape 22 are housed (inserted) in the recessed housing portions 24 and retained at predetermined positions inside the case 12.

Next, the rotating shaft 100 is lowered, the drive gear 102 disengages from the reel gear 50, and the magnet 106 is separated from the reel plate 52. Then, the reel 40 falls as a result of the urging force of the compression coil spring 78 via the brake member 80. When this happens, the lock members 90 slide outward in the radial direction inside the housing portions 63 due to the urging force of the plate spring 56, and the tapered surfaces 94A of the cam portions 94 slide on the tapered surfaces 86A of the engagement protrusions 86.

At this time, the lock members 90 can stably slide without falling out from the housing portions 63 (i.e., the attachment portion 60).

Then, the engagement protrusions 86 separate from the cam portions 94, whereby the engagement portions 96 engage with the upper edge portion of the reel hub 42. Namely, due to the urging force of the plate spring 56, the outer side surfaces of the engagement portions 96 excluding the tapered surfaces 96A push against the inner peripheral surface of the reel hub 42, and the outer side end portions 92A of the body portions 92 are intervened between the upper surface of the upper flange 44 and the inner surface of the top plate 14A (the undersurfaces of the end portions 92A contact the upper surface of the upper flange 44 or face the upper surface of the upper flange 44 with an extremely minute gap therebetween). Thus, the reel 40 is again placed in a state where it is prevented from rising.

At this time, due to the urging force of the compression coil spring 78, the brake gear 82 strongly meshes with the engagement gear 54 so that inadvertent rotation of the reel 40 is prevented. Then, after the rotating shaft 100 has been removed from the gear opening 18, the recording tape cartridge 10 is ejected through the loading port, and in accompaniment with this ejection operation, the open/close member separates from the right end portion of the door 30. Then, the door 30 rotates in the opposite direction around the support shaft 26 due to the urging force of the torsion spring 28 to close off the opening 20. Then, the recording tape cartridge 10 whose opening 20 has been closed off is ejected from the drive device.

In any event, when the lock members 90 are incorporated in the attachment portion 60 (i.e., inside the housing portions 63), they are retained by the undercut portions 70A, which project towards the lock members 90, of the retention portions 70 formed at both sides of each housing portion 63, and are retained in a state where a certain tension is applied by the plate spring 56 urging the lock members 90 outward in the radial direction from the center of the reel 40 and by the stopper ribs 74 disposed on lines extending from the housing portions 63.

Thus, the lock members 90 are prevented from popping out of the attachment portion 60 (i.e., the housing portions 63), and the stopper 76 can be easily welded to the support ribs 66. Also, by welding the stopper 76, the lock members 90 can be prevented from falling out when the case 12 is assembled by covering the lower case 16 with the upper case 14. Thus, the assembly work can be done easily and excellently.

Additionally, after the assembly of the recording tape cartridge 10 (i.e., the case 12), the lock members 90 are retained by the stopper 76 so that they are prevented from falling out even when they slide, so that the lock members 90 can stably slide without coming out of the attachment portion 60 (i.e., the housing portions 63).

Next, a modified example will be described where, instead of the plate spring 56, coil springs 58 are used as the urging means urging the lock members. In the drawings, the same reference numerals will be given to portions that are the same as those already described above, and description of those same portions will be omitted. Also, a coil spring 58 is disposed with respect to each lock member 91. Thus, in this case, three coil springs 58 are disposed, but there is the advantage that the coil springs 58 are less expensive than the plate spring 56.

Figure 14:
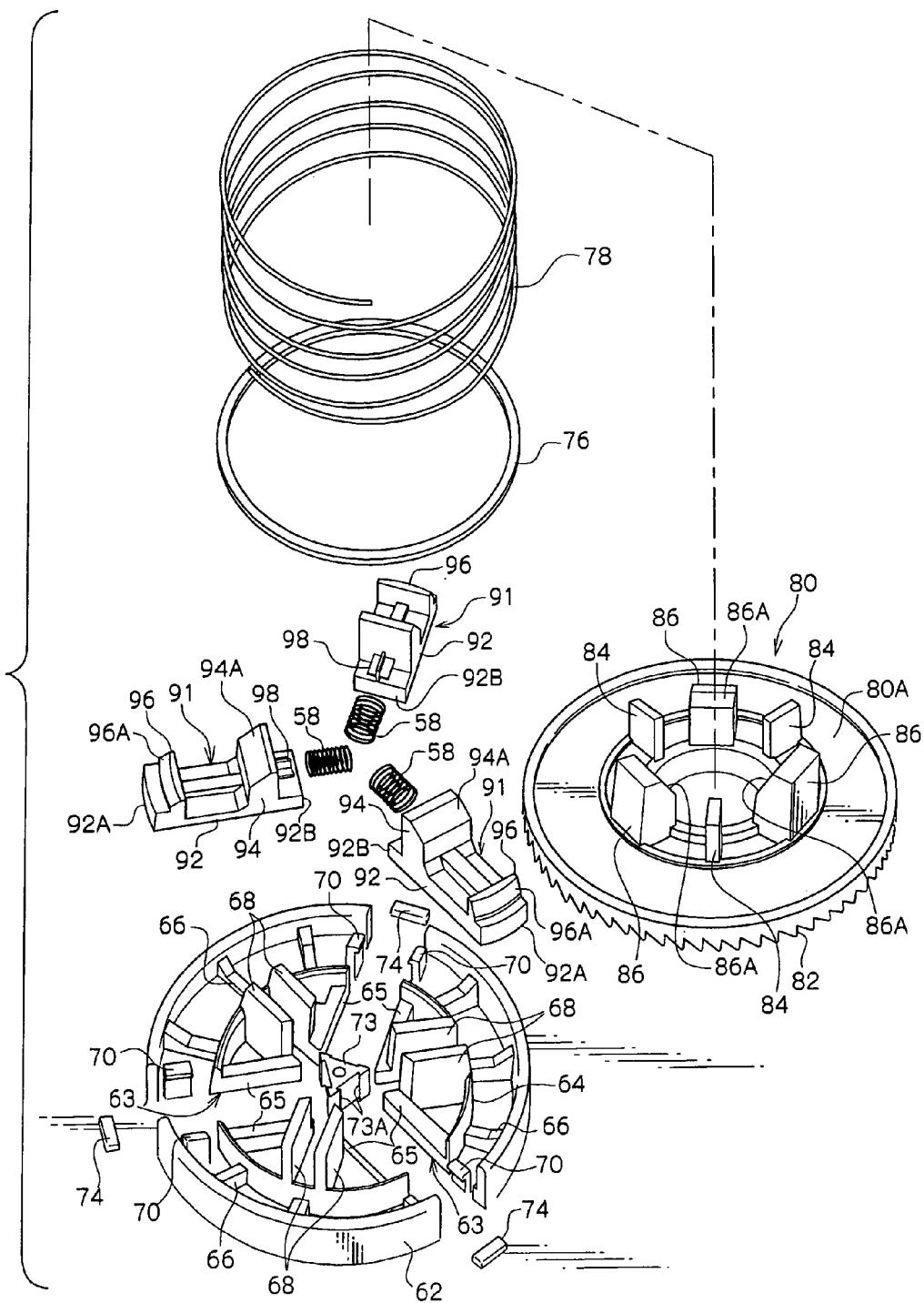
FIG. 14 is a schematic exploded perspective view showing another configuration of the attachment portion formed in the upper case.
Figure 15:
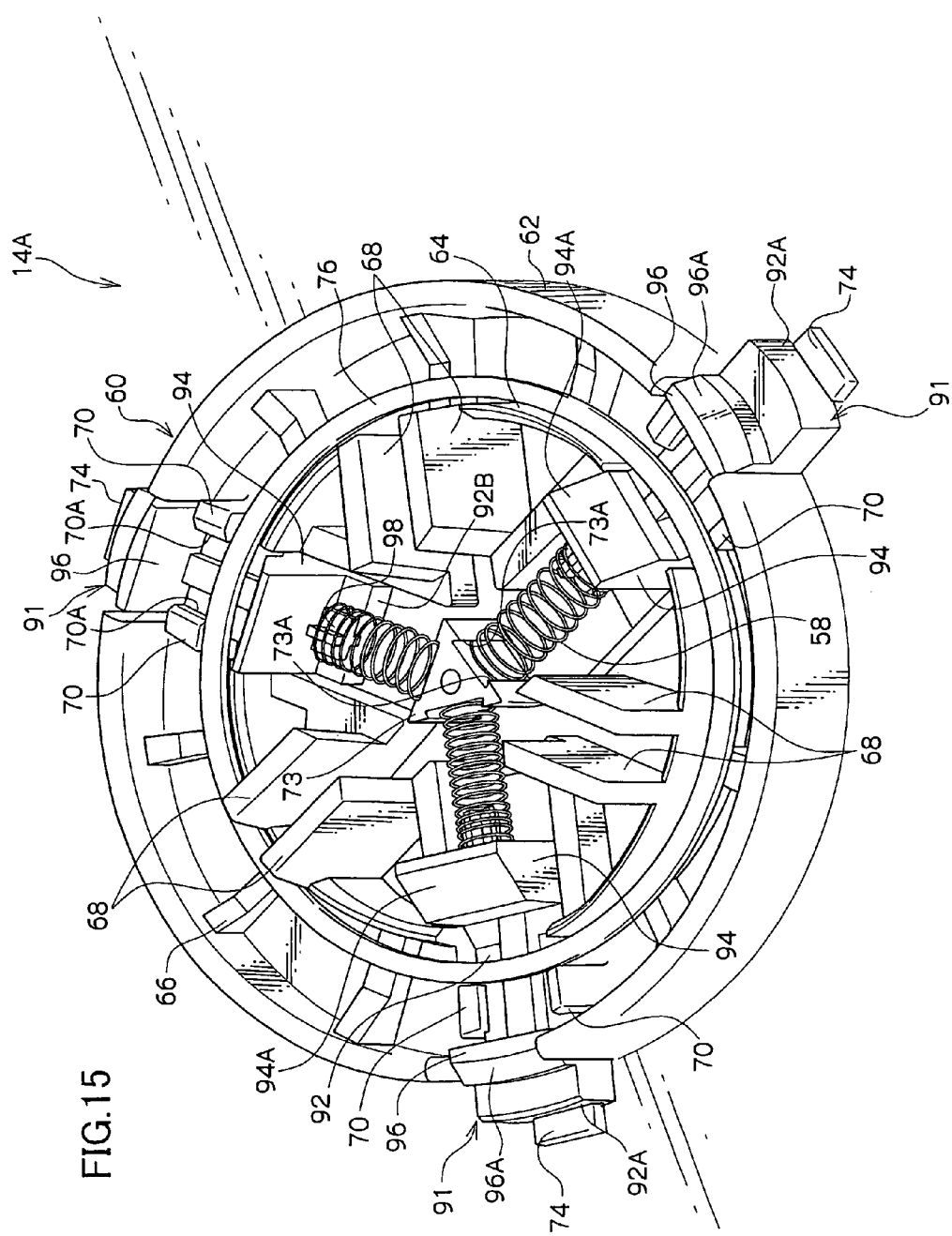
FIG. 15 is a schematic perspective view showing the attachment portion formed in the upper case.
Figure 16:
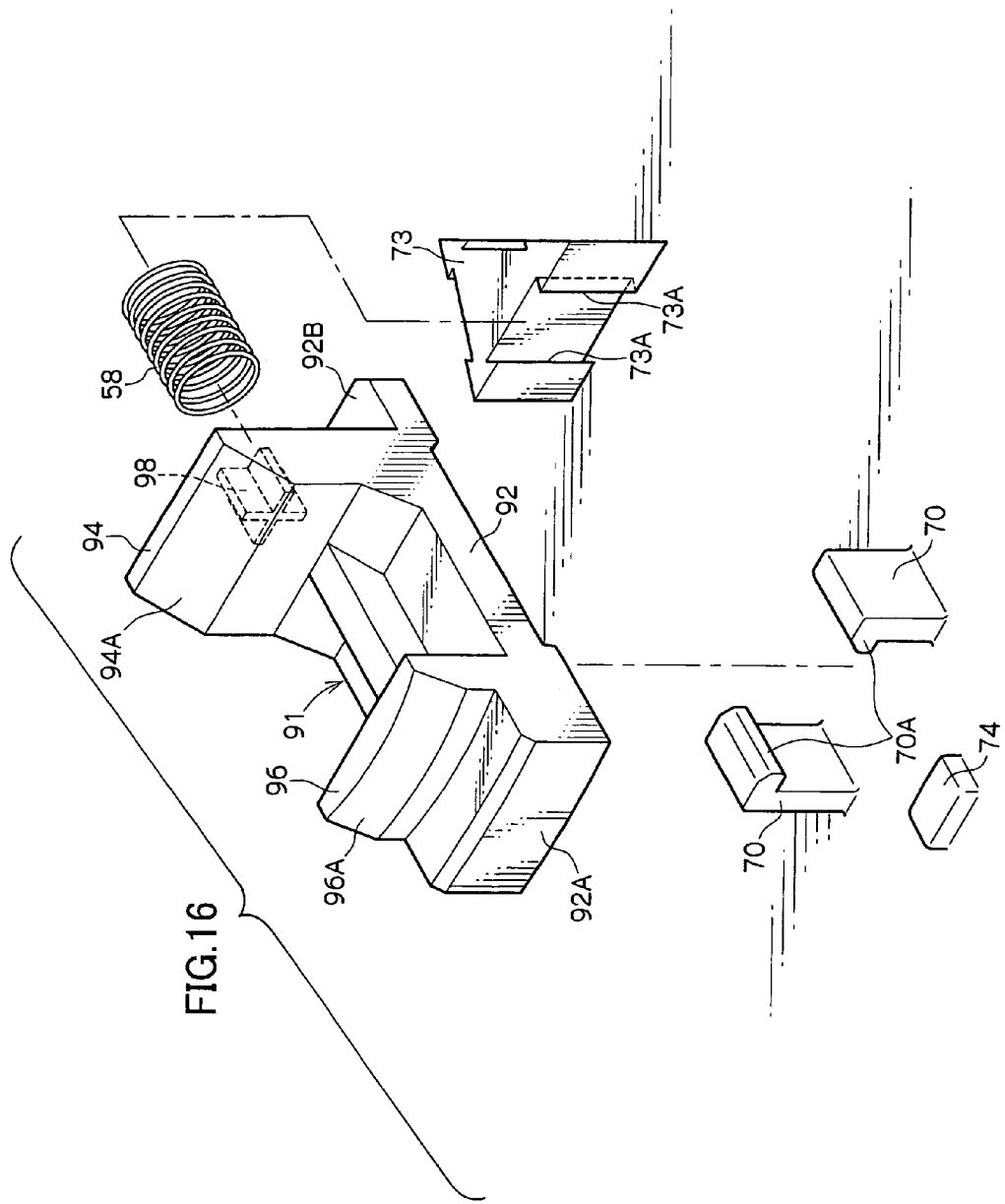
FIG. 16 is a schematic perspective view showing a lock member and a coil spring.

As shown in FIGS. 14 to 16, when the coil springs 58 are used, lock members 91 are used which are different from the lock members 90 in terms of the following. Namely, the lock portions 91 include cam portions 94 that project at a right angle (in the axial direction of the reel 40) with respect to the body portions 92. Additionally, the end portions 92B of the body portions 92 further inward in the radial direction than the cam portions 94 extend a predetermined length inward in the radial direction.

Moreover, fitting portions 98, which are substantially cross-shaped when seen in sectional view and around which the coil springs 58 fit, are disposed at radial-direction inner side surfaces of the cam portions 94 so as to project a predetermined length inward in the radial direction. The outer diameter of the fitting portions 98 is formed slightly smaller than the inner diameter of the coil springs 58, and is configured so that the coil springs 58 cannot come off of the fitting portions 98.

Instead of the caulking-use pin 72, a stop protrusion 73 for retaining the coil springs 58 is disposed in the center of the attachment portion 60. The stop protrusion 72 is formed in a substantially triangular shape so that it can retain the three coil springs 58 at once. A pair of stop pawls 73A that can stop and retain one end (one coil) of each coil spring 58 from both sides is formed, across the entire height, at both end portions of each side surface of the stop protrusion 73 so as to project inward.

It is preferable to mold fitting portions 98 on the stop protrusion 73 also, but in this case molding becomes difficult because of undercuts. Thus, the pairs of stop pawls 73A are formed across the entire height of the stop protrusion 73. When the coil springs 58 and the lock members 91 are incorporated, the incorporability thereof can thus be made excellent and they can be reliably retained between the stop protrusion 73 and the stopper ribs 74.

Also, although it is easy to attach the plate spring 56 even after the stopper 76 has been welded to the support ribs 66, it is difficult to attach the coil springs 58 after the stopper 76 has been welded to the support ribs 66. Thus, it is necessary to retain the lock members 91 so that the lock members are prevented from popping out.

For this reason, not only are the stop pawls 73A formed at the stop protrusion 73, but the radial-direction inner side end portions 92B of the body portions 92 extend a predetermined length (so that they are slightly longer than the fitting portions 98).

According to this configuration, the center of gravity of the lock members 91 can be lowered, so that when the lock members 91 and the coil springs 58 are incorporated in the attachment portion 60 (i.e., the housing portions 63) and retained between the stop protrusion 73 and the stopper ribs 74, the lock members 91 can be prevented from popping out of the attachment portion 60 (i.e., the housing portions 63) by the tension of the coil springs 58.

Next, the action of the recording tape cartridge 10 using the coil springs 58 will be described. Because the action here other than the part relating to the coil springs 58 is the same as that described previously, description of the same action will be omitted.

Figure 17:
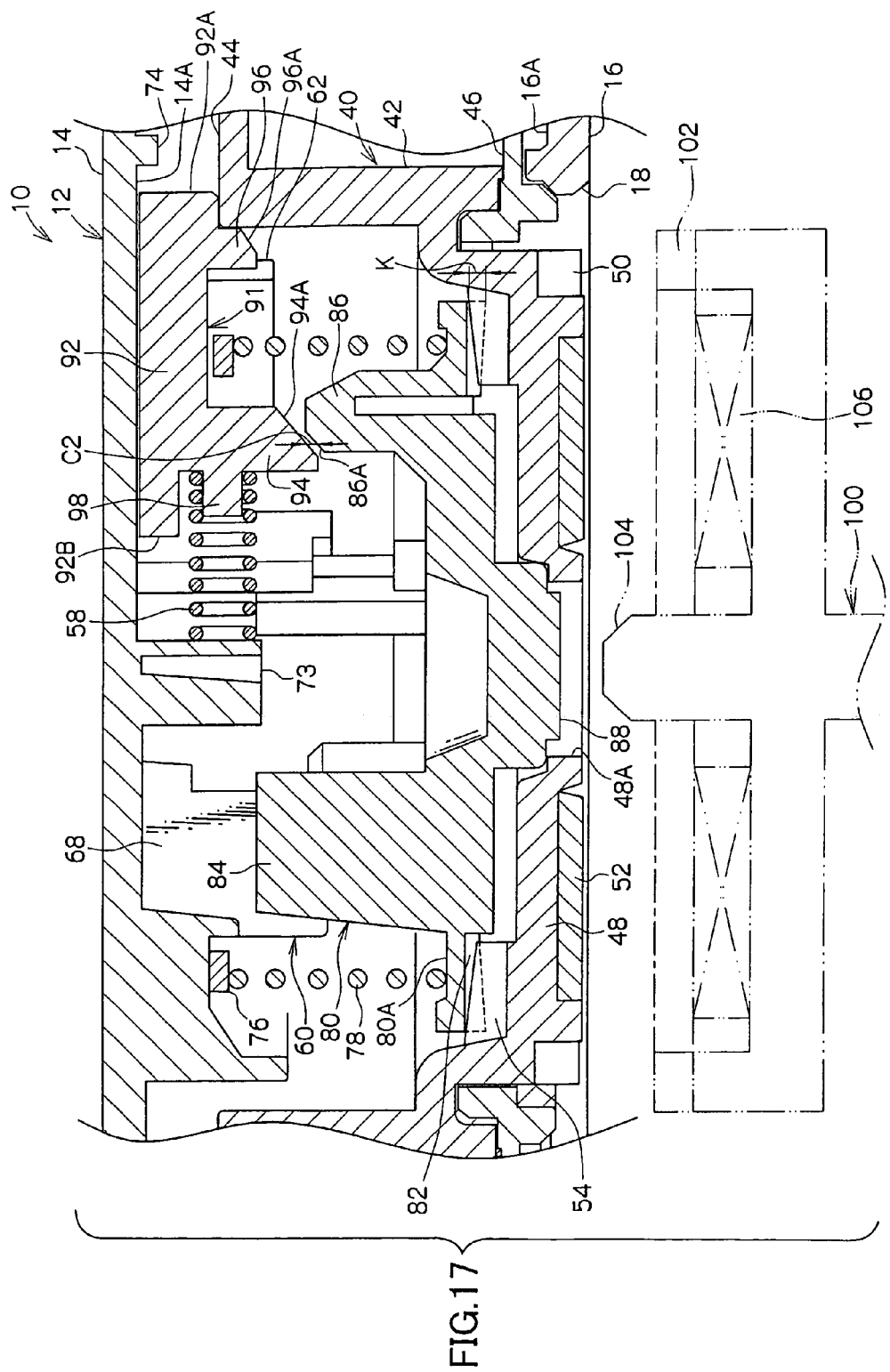
FIG. 17 is a partially enlarged schematic side sectional view of the recording tape cartridge prior to the rising of the rotating shaft.

As shown in FIG. 17, when the recording tape cartridge 10 is not in use (i.e., when it has not been loaded into the drive device), the reel 40 is urged downward by the compression coil spring 78 via the brake member 80. In other words, due to the urging force of the compression coil spring 78, the brake gear 82 of the brake member 80 strongly meshes with the engagement gear 54 inside the reel hub 42, and inadvertent rotation of the reel 40 is prevented.

Also, due to the urging force of the coil springs 58, the lock members 91 are urged outward in the radial direction from the center of the attachment portion 60 (i.e., the center of the reel 40), and the engagement portions 96 engage with the upper edge portion of the reel hub 42.

Namely, the outer side surfaces of the engagement portions 96 excluding the tapered surfaces 96A push against the inner peripheral surface of the reel hub 42, and the end portions 92A of the body portions 92 further outward in the radial direction from the engagement portions 96 are intervened between the upper surface of the upper flange 44 and the inner surface of the top plate 14A (i.e., the lower surfaces of the end portions 92A contact the upper surface of the upper flange 44 or face the upper surface of the upper flange 44 with an extremely minute gap therebetween).

Here, because the thickness D of the outer side end portions 92A of the lock members 91 (i.e., the body portions 92) is substantially the same as the distance W between the upper surface of the upper flange 44 and the inner surface of the top plate 14A when the reel 40 is positioned at its lowermost position inside the case 12, the reel 40 is prevented from rising due to the lock members 91.

In other words, the reel 40 does not rise even if an impact is applied to the recording tape cartridge 10 as a result of dropping thereof or the like. Thus, drawbacks such as the brake member 80 slanting and getting caught (falling) do not arise, and drawbacks such as the outer peripheral edges of the upper flange 44 and lower flange 46 striking the inner surface of the case 12 and becoming deformed do not arise. Thus, the recording tape T is not adversely affected.

When data is to be recorded on the recording tape T of the recording tape cartridge 10, or when data recorded on the recording tape T of the recording tape cartridge 10 is to be played back, the recording tape cartridge 10 is loaded into a drive device (not shown). Namely, the recording tape cartridge 10 is inserted, from the front wall 12A side thereof, into a loading port (not shown) of the drive device. In accompaniment with this loading, the open/close member (not shown) of the drive device relatively approaches and abuts against the right end portion of the door 30 (the door portion which is located on the right hand side of the support shaft 26), and pushes the right end portion of the door 30.

When the open/close member pushes the right end portion of the door 30, the door 30 rotates around the support shaft 26 counter to the urging force of the torsion spring 28 and opens up the opening 20. When the door 30 rotates and the opening 20 is opened, the pullout member (not shown) of the drive device approaches the opening 20 from the left side wall 12B side and engages with the hole portion 22A of the leader tape 22. Then, the pullout member engaged with the hole portion 22A separates from the opening 20, whereby the leader tape 22 is pulled out from the inside the case 12 and wound onto a take-up reel (not shown) of the drive device.

Figure 18:
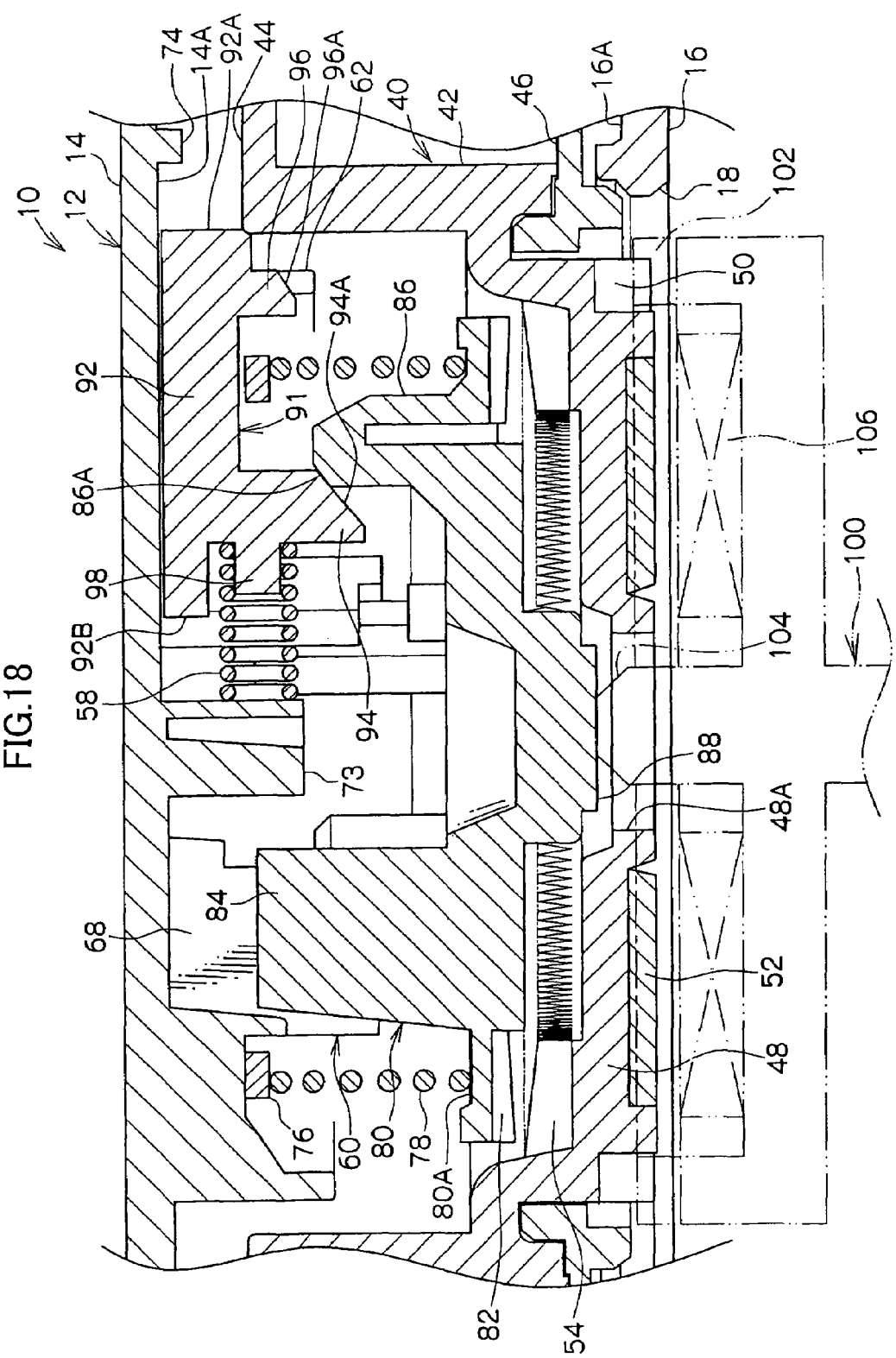
FIG. 18 is a partially enlarged schematic side sectional view of the recording tape cartridge as the rotating shaft is ascending.

As shown in FIG. 18, the rotating shaft 100 of the drive device enters the case 12 through the gear opening 18 and approaches the bottom wall 48 of the reel 40. Namely, the release protrusion 104 pushes the operational protrusion 88 and causes the brake member 80 to rise. Then, the engagement gear 54 disengages from the brake gear 82, but prior to this, the engagement protrusions 86 abut against the cam portions 94 of the lock members 91 and push the cam portions 94 upward.

Then, the tapered surfaces 94A of the cam portions 94 slide on the tapered surfaces 86A of the engagement protrusions 86, and the lock members 91 slide inward in the radial direction on the inner surface of the top plate 14A (i.e., inside the housing portions 63) counter to the urging force of the coil springs 58. At this time, the lock members 91 can slide with little resistance because the concave portions 92C are formed in the body portions 92. The lock members 91 can also stably slide without falling out of the housing portions 63 (i.e., the attachment portion 60) due to the stopper 76.

Then, when the lock members 91 slide inward in the radial direction inside the housing portions 63, the outer side surfaces of the engagement portions 96 of the lock members 91 separate from the inner peripheral surface of the reel hub 42, and the outer side end surfaces 92A of the body portions 92 move out from the between the upper surface of the upper flange 44 and the inner surface of the top plate 14A (i.e., the undersurfaces of the end portions 92A separate from the upper surface of the upper flange 44).

Figure 19:
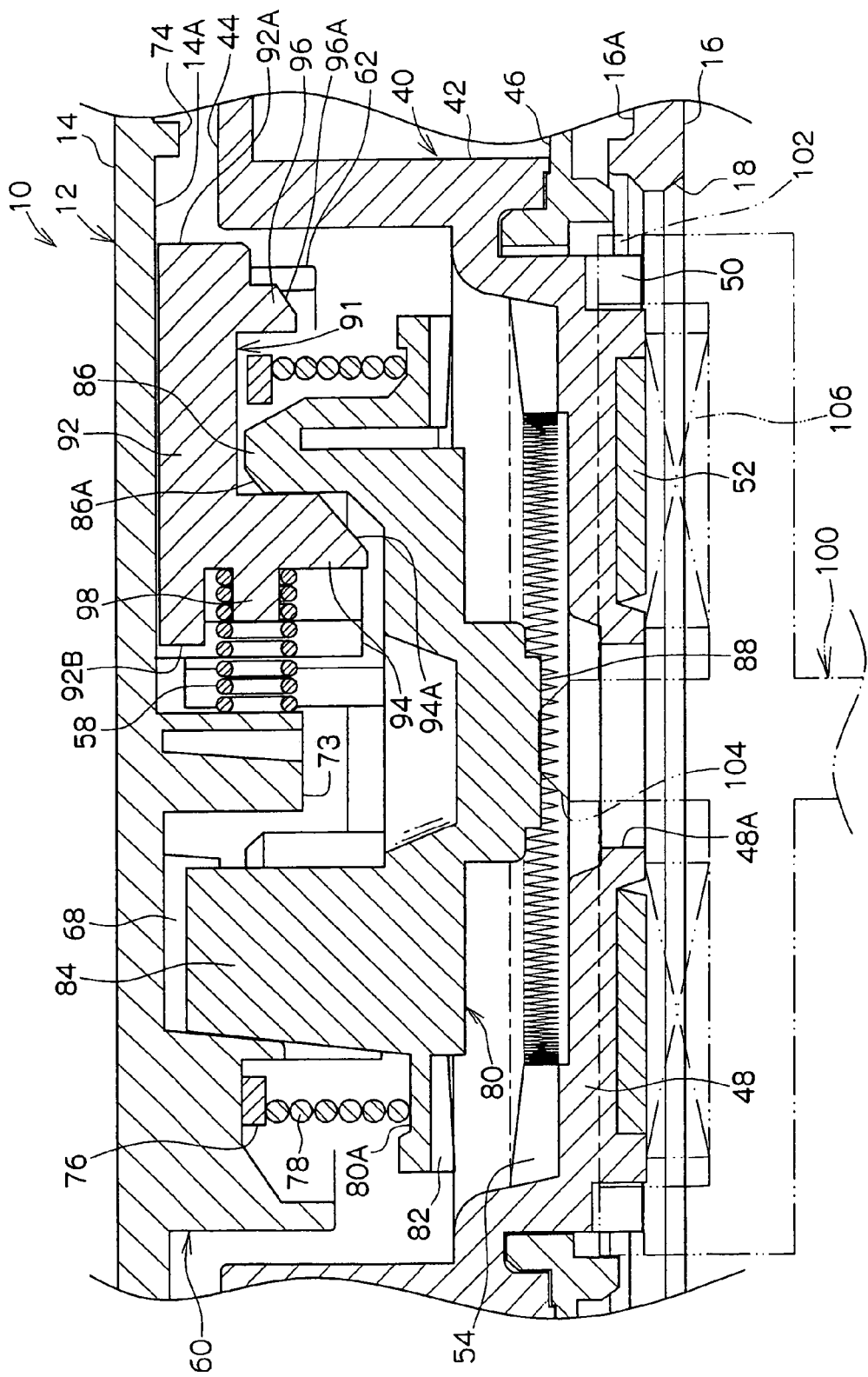
FIG. 19 is a partially enlarged schematic side sectional view of the recording tape cartridge after the rising of the rotating shaft.
Figure 20:
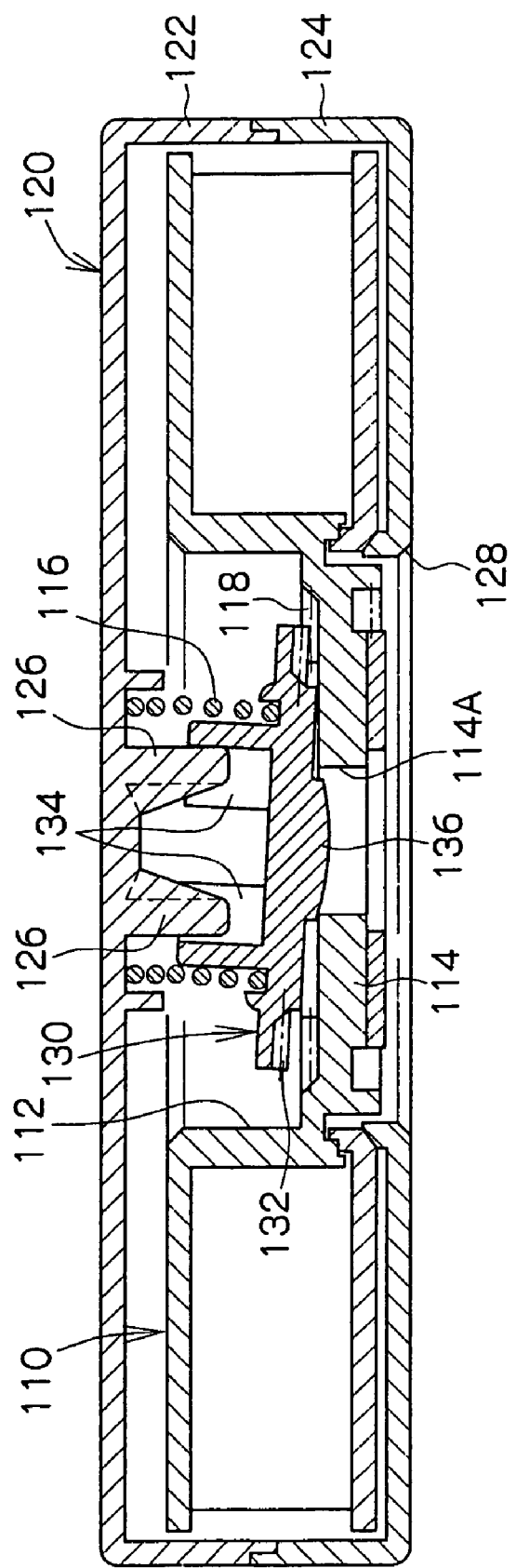
FIG. 20 is a schematic side sectional view of a conventional recording tape cartridge.

Then, as shown in FIG. 19, the cam portions 94 enter the inner sides of the engagement protrusions 86, whereby the outer side end portions 92A of the body portions 92 are disposed at the inner side of the reel hub 42 and the outer side surfaces of the cam portions 94 abut against the inner side surfaces of the engagement protrusions 86. Thus, the engagement portions 96 disengage from the upper edge portion of the reel hub 42, and the lock members 91 are retained in an unlocked state.

Then, the rotating shaft 100 rises, whereby the drive gear 102 meshes with the reel gear 50 and the reel plate 52 is attracted to the magnet 106. When the drive gear 102 meshes with the reel gear 50, the reel 40 rises to a predetermined height inside the case 12 and become rotatable, and the drive gear 102, i.e., the reel 40 is rotatingly driven in synchronous with the take-up reel, whereby the recording tape T is sequentially sent to the drive device. Then, recording of data to the recording tape T, or playback of data recorded on the recording tape T, is conducted with the recording/playback head (not shown) of the drive device.

When the recording tape cartridge 10 is to be removed from the drive device, first the drive gear 102 is rotated in reverse and the recording tape T is rewound onto the reel 40. Then, the leader tape 22 is removed from the take-up reel and returned to the inside of the case 12 through the opening 20. In other words, the projecting portions 22B of the leader tape 22 are housed (inserted) in the recessed housing portions 24 and retained at predetermined positions inside the case 12.

Next, the rotating shaft 100 is lowered, the drive gear 102 disengages from the reel gear 50, and the magnet 106 is separated from the reel plate 52. Then, the reel 40 falls as a result of the urging force of the compression coil spring 78 via the brake member 80.

When this happens, the lock members 91 slide outward in the radial direction inside the housing portions 63 due to the urging force of the coil springs 58, and the tapered surfaces 94A of the cam portions 94 slide on the tapered surfaces 86A of the engagement protrusions 86. At this time also, the lock members 91 can stably slide without falling out from the housing portions 63 (i.e., the attachment portion 60) owing to the stopper 76.

Then, the engagement protrusions 86 separate from the cam portions 94, whereby the engagement portions 96 engage with the upper edge portion of the reel hub 42. Namely, due to the urging force of the coil springs 58, the outer side surfaces of the engagement portions 96 excluding the tapered surfaces 96A push against the inner peripheral surface of the reel hub 42, and the outer side end portions 92A of the body portions 92 are intervened between the upper surface of the upper flange 44 and the inner surface of the top plate 14A (the undersurfaces of the end portions 92A contact the upper surface of the upper flange 44 or face the upper surface of the upper flange 44 with an extremely minute gap therebetween). Thus, the reel 40 is again placed in a state where it is prevented from rising.

At this time, due to the urging force of the compression coil spring 78, the brake gear 82 strongly meshes with the engagement gear 54 so that inadvertent rotation of the reel 40 is prevented.

Then, after the rotating shaft 100 has been removed from the gear opening 18, the recording tape cartridge 10 is ejected through the loading port, and in accompaniment with this ejection operation, the open/close member separates from the right end portion of the door 30. Then, the door 30 rotates in the opposite direction around the support shaft 26 due to the urging force of the torsion spring 28 to close off the opening 20. Then, the recording tape cartridge 10 whose opening 20 has been closed off is ejected from the drive device.

In any event, when the lock members 91 are incorporated in the attachment portion 60 (i.e., inside the housing portions 63), they are retained by the undercut portions 70A, which project towards the lock members 90, of the retention portions 70 formed at both sides of each housing portion 63, and are retained in a state where a certain tension is applied by the plate spring 56 urging the lock members 91 outward in the radial direction from the center of the reel 40 and by the stopper ribs 74 disposed on lines extending from the housing portions 63.

Thus, the lock members 91 are prevented from popping out from the attachment portion 60 (i.e., the housing portions 63), and the stopper 76 can be easily welded to the support ribs 66. Also, by welding the stopper 76, the lock members 91 can be prevented from falling out when the case 12 is assembled by covering the lower case 16 with the upper case 14. Thus, the assembly work can be done easily and excellently.

Additionally, after the assembly of the recording tape cartridge 10 (i.e., the case 12), the lock members 91 are retained by the stopper 76 so that they are prevented from falling out even when they slide, so that the lock members 91 can stably slide without coming out of the attachment portion 60 (i.e., the housing portions 63).

In the preceding examples, the plate spring 56 and the coil springs 58 were described as example of urging means urging the lock members 90 and 91 outward in the radial direction from the center of the reel 40 (i.e., the attachment portion 60), but the urging means are not limited to these. For example, the urging means may also be configured by torsion springs.

Also, in the preceding examples, a configuration was described where the lock members 90 and 91 were caused to slide in the radial direction as a result of their engagement with the brake member 80, but the configuration causing the lock members 90 and 91 to slide in the radial direction is not limited to this. For example, the invention may also be configured so that a switch member that switches the lock members 90 and 91 between a rise/fall lock position (i.e., a position at which movement in the axial direction of the reel 40 is prevented) and a rise/fall allowance position (i.e., a position at which movement in the axial direction of the reel 40 is allowed) is disposed separately from the brake member 80. However, in this case, it is preferable for the switch member to operate in association with the brake member 80.

What is claimed is:

1. A recording tape cartridge comprising:
   a case that houses a reel onto which a recording tape is wound, the case comprising an upper case including a top plate and a lower case including a bottom plate;
   lock members that are disposed, so as to be slidable in a radial direction of the reel, in an attachment portion formed on an inner surface of the top plate, the lock members being movable between a rise/fall lock position, at which the lock members are intervened between an upper surface of the reel and the top plate to prevent movement in an axial direction of the reel, and a rise/fall allowance position, at which the lock members are retracted from between the upper surface of the reel and the top plate to allow movement in the axial direction of the reel; and
   projecting portions that are formed on the inner surface of the top plate and project towards the lock members so that the lock members do not fall out of the attachment portion at least when the case is assembled.

2. The recording tape cartridge of claim 1, further comprising a fallout prevention member that is disposed so as to straddle the lock members and which retains the lock members so that the lock members do not fall out of the attachment portion at the time the lock members slide.

3. The recording tape cartridge of claim 2, where a predetermined clearance is secured between the lock members and the fallout prevention member.

4. The recording tape cartridge of claim 1, wherein the lock members are urged, by urging means disposed in the attachment portion, outward in the radial direction from a center of the reel.

5. The recording tape cartridge of claim 4, further comprising position regulating means that regulate the positions of the lock members urged by the urging means outward in the radial direction of the reel.

6. The recording tape cartridge of claim 4, further comprising a brake member that is movable in the axial direction of the reel between a braking position, at which the brake member locks the rotation of the reel with respect to the case, and a non-braking position, at which the brake member allows the rotation of the reel with respect to the case.

7. The recording tape cartridge of claim 1, wherein surfaces of the lock members that contact the top plate have shapes that reduce the contact between the lock members and the top plate.

8. A recording tape cartridge comprising:
  a case that houses a reel onto which a recording tape is wound, with the case comprising an upper case including a top plate and a lower case including a bottom plate;
  lock members that are disposed, so as to be slidable in a radial direction of the reel, in an attachment portion formed on an inner surface of the top plate, the lock members being movable between a rise/fall lock position, at which the lock members are intervened between an upper surface of the reel and the top plate to prevent movement in an axial direction of the reel, and a rise/fall allowance position, at which the lock members are retracted from between the upper surface of the reel and the top plate to allow movement in the axial direction of the reel; and
  a fallout prevention member that is disposed so as to straddle the lock members and which retains the lock members so that the lock members do not fall out of the attachment portion at the time the lock members slide.

9. The recording tape cartridge of claim 8, where a predetermined clearance is secured between the lock members and the fallout prevention member.

10. The recording tape cartridge of claim 8, further comprising projecting portions that are formed on the inner surface of the top plate and project towards the lock members so that the lock members do not fall out of the attachment portion at least when the case is assembled.

11. The recording tape cartridge of claim 8, wherein the lock members are urged, by urging means disposed in the attachment portion, outward in the radial direction from a center of the reel.

12. The recording tape cartridge of claim 11, further comprising position regulating means that regulate the positions of the lock members urged by the urging means outward in the radial direction of the reel.

13. The recording tape cartridge of claim 11, further comprising a brake member that is movable in the axial direction of the reel between a braking position, at which the brake member locks the rotation of the reel with respect to the case, and a non-braking position, at which the brake member allows the rotation of the reel with respect to the case.

* * * * *